Figure 1:
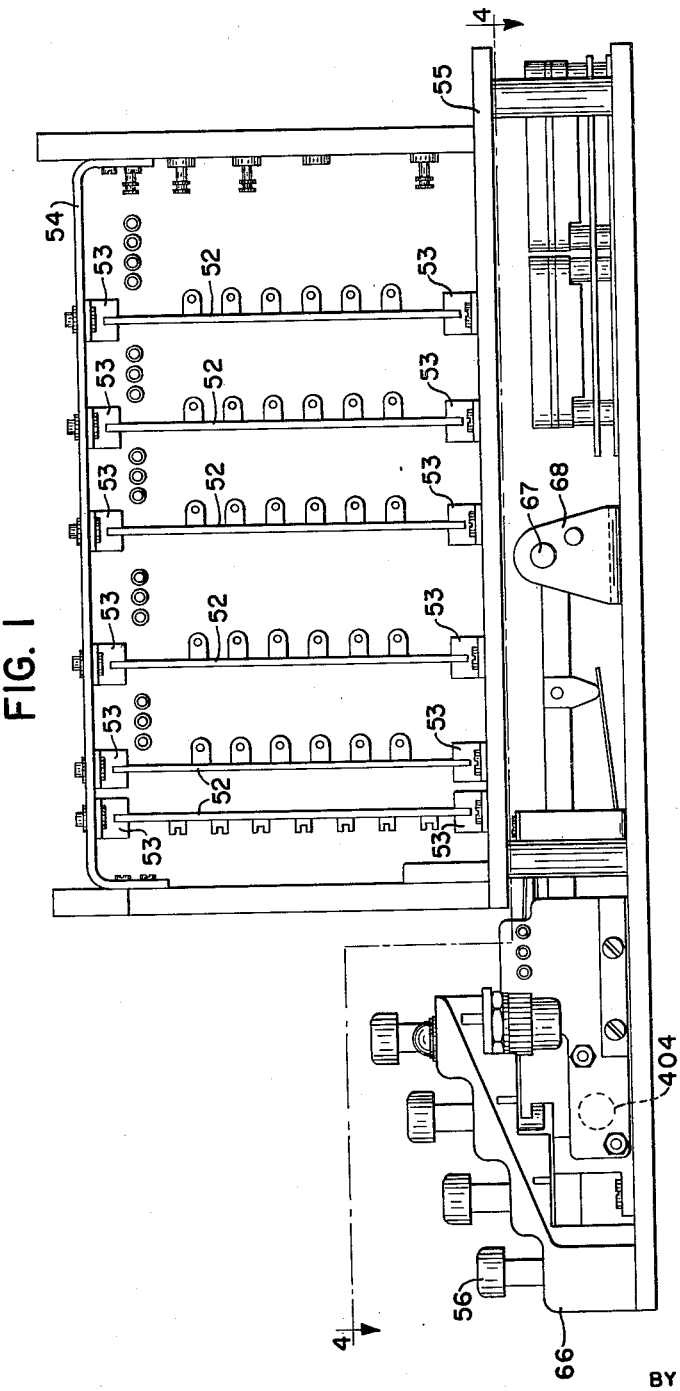

INVENTORS
ROBERT C. MECKSTROTH
STANLEY J. SULEK
ROGER W. MORIN
JOHN H. DAY
THOMAS M. SILCOTT &
WILLIAM E. DAVIES
BY
THEIR ATTORNEYS

June 30, 1964 R. C. MECKSTROTH ETAL 3,139,026
THERMAL PRINTERS
Filed July 2, 1963 17 Sheets-Sheet 4

INVENTORS
ROBERT C. MECKSTROTH
STANLEY J. SULEK
ROGER H. MORIN
JOHN H. DAY
THOMAS M. SILCOTT &
WILLIAM E. DAVIES

BY Louis A. Kline
Richard G. Stahr

THEIR ATTORNEYS

June 30, 1964  R. C. MECKSTROTH ETAL  3,139,026
THERMAL PRINTERS
Filed July 2, 1963  17 Sheets-Sheet 5

INVENTORS
ROBERT C. MECKSTROTH
STANLEY J. SULEK
ROGER W. MORIN
JOHN H. DAY
THOMAS M. SILCOTT &
WILLIAM E. DAVIES

BY

THEIR ATTORNEYS

June 30, 1964

R. C. MECKSTROTH ET AL 3,139,026

THERMAL PRINTERS

Filed July 2, 1963

17 Sheets—Sheet 7

INVENTORS
ROBERT C. MECKSTROTH
STANLEY J. SULEK
ROGER W. MORIN
JOHN H. DAY
THOMAS M. SILCOTT &
WILLIAM E. DAVIES

BY Louis A Kline

Richard G. Stahr

THEIR ATTORNEYS

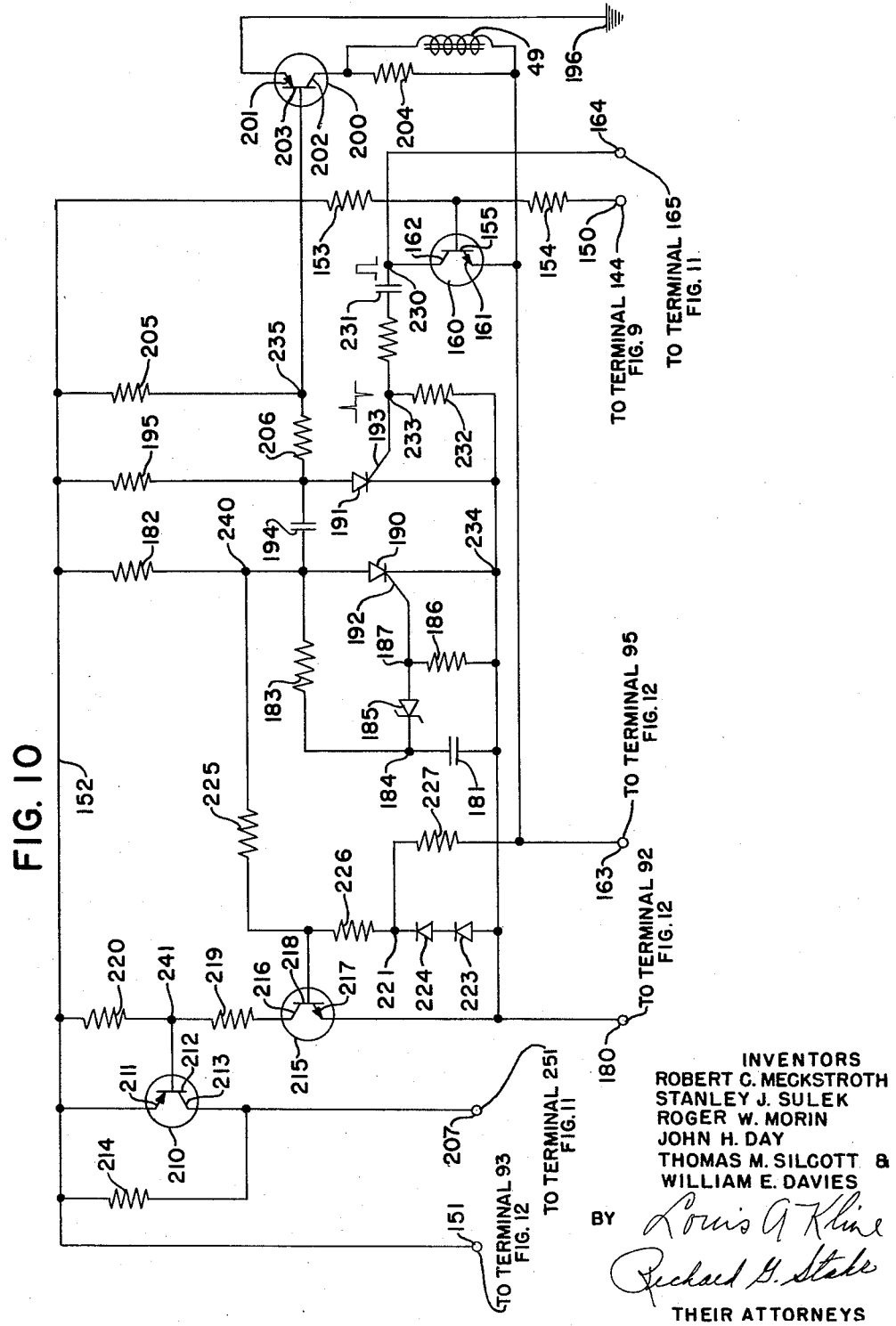

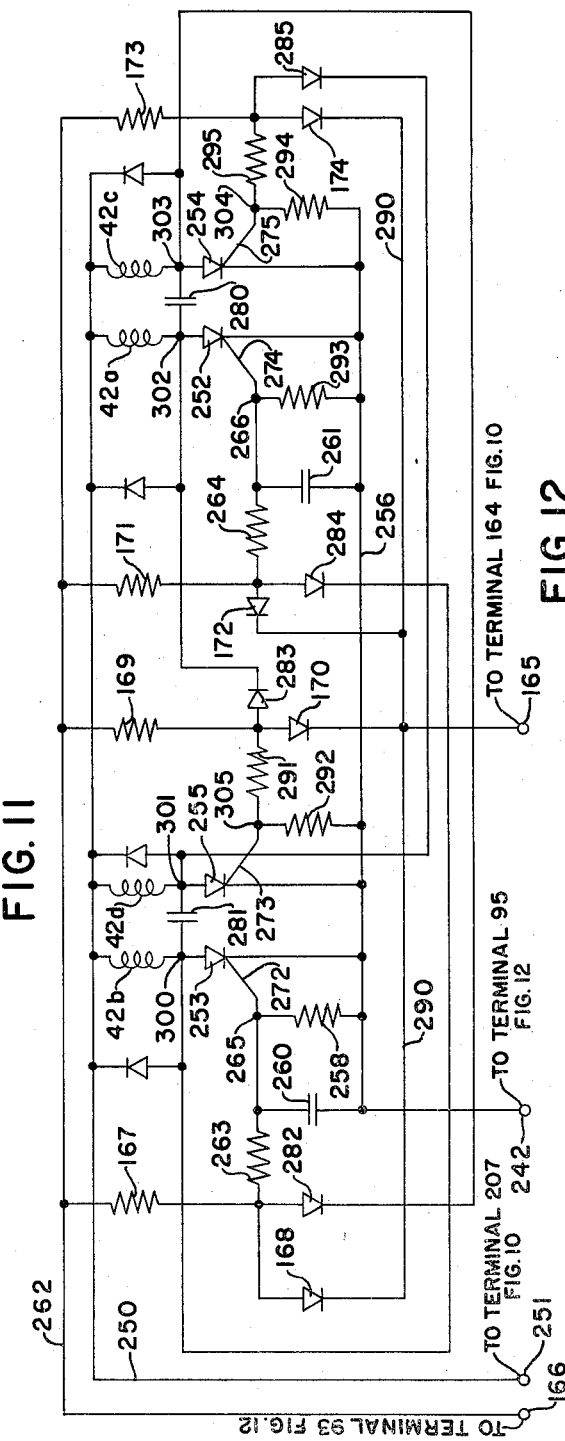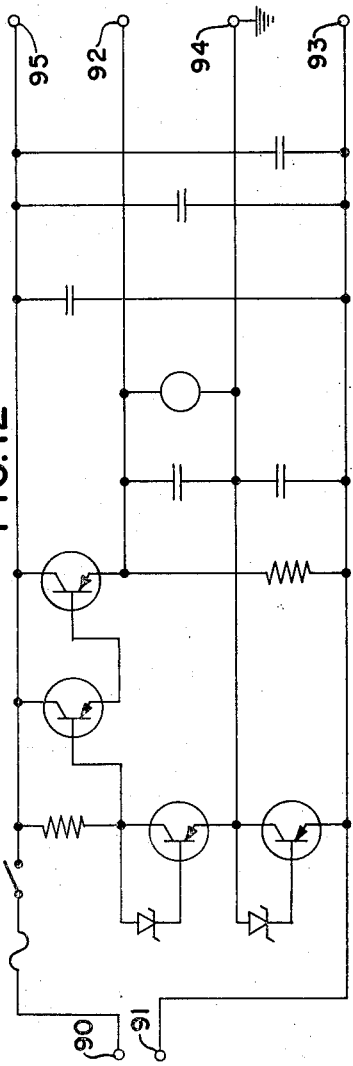

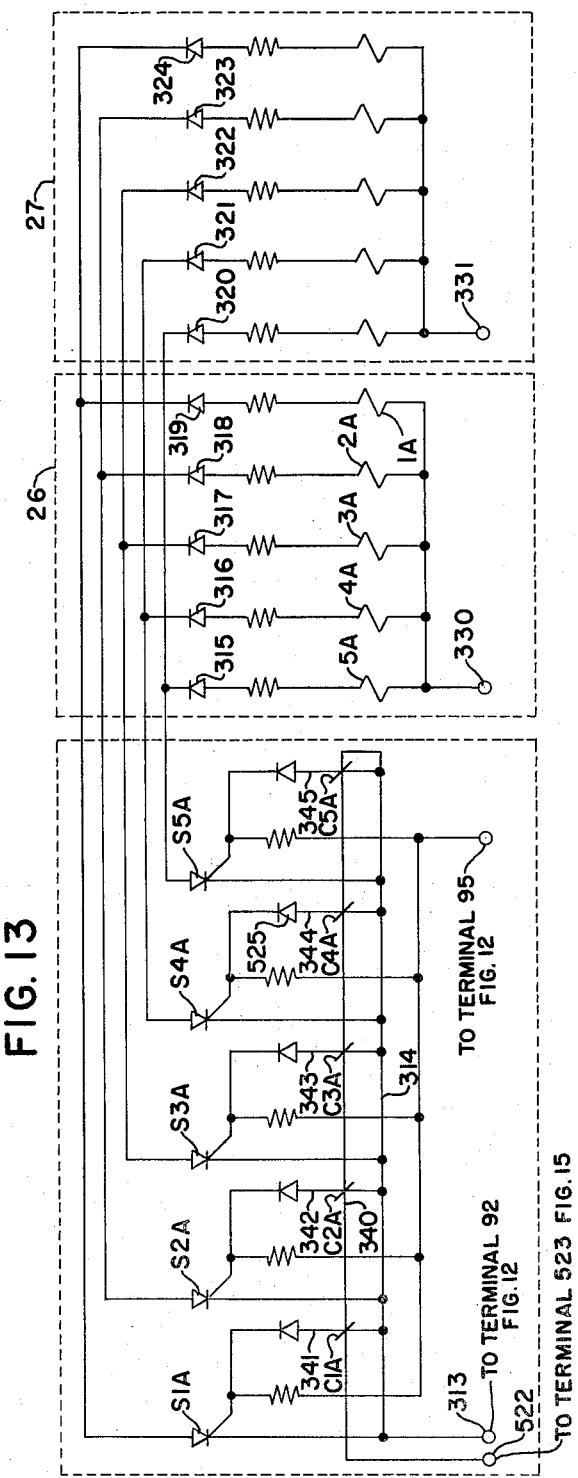

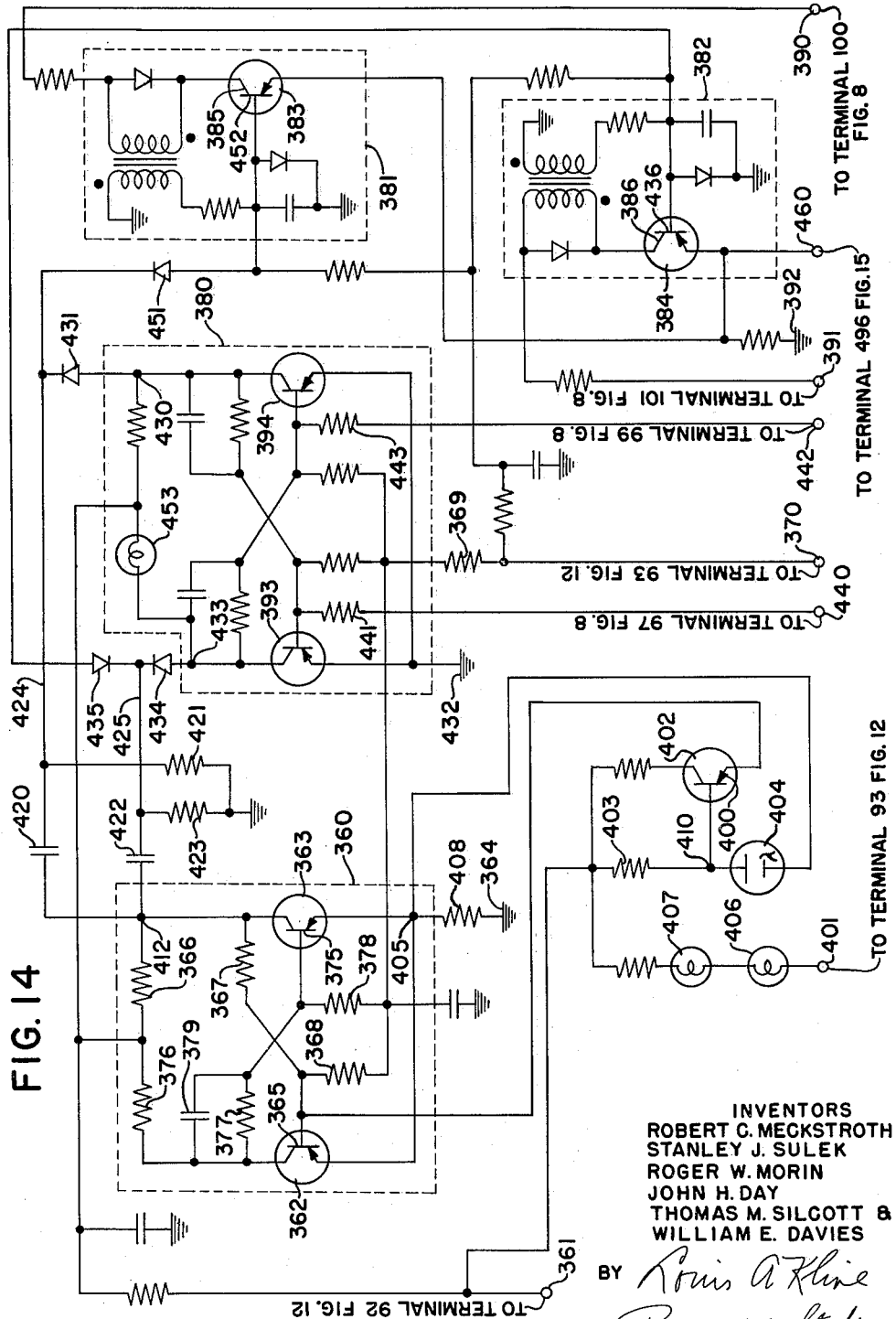

June 30, 1964  R. C. MECKSTROTH ETAL  3,139,026
THERMAL PRINTERS
Filed July 2, 1963  17 Sheets-Sheet 12

FIG.15

INVENTORS
ROBERT C. MECKSTROTH
STANLEY J. SULEK
ROGER W. MORIN
JOHN H. DAY
THOMAS M. SILCOTT &
WILLIAM E. DAVIES

BY Louis A. Kline
Richard G. Stake
THEIR ATTORNEYS

INVENTORS
ROBERT C. MECKSTROTH
STANLEY J. SULEK
ROGER W. MORIN
JOHN H. DAY
THOMAS M. SILCOTT &
WILLIAM E. DAVIES

BY
THEIR ATTORNEYS

June 30, 1964   R. C. MECKSTROTH ET AL   3,139,026
THERMAL PRINTERS
Filed July 2, 1963   17 Sheets-Sheet 16

INVENTORS
ROBERT C. MECKSTROTH
STANLEY J. SULEK
ROGER W. MORIN
JOHN H. DAY
THOMAS M. SILCOTT &
WILLIAM E. DAVIES
BY
THEIR ATTORNEYS

June 30, 1964    R. C. MECKSTROTH ET AL    3,139,026
THERMAL PRINTERS

Filed July 2, 1963    17 Sheets-Sheet 17

FIG. 22

INVENTORS
ROBERT C. MECKSTROTH
STANLEY J. SULEK
ROGER W. MORIN
JOHN H. DAY
THOMAS M. SILCOTT &
WILLIAM E. DAVIES

BY  Louis A Kline
    Richard G Stahr

THEIR ATTORNEYS

United States Patent Office 3,139,026
Patented June 30, 1964

3,139,026
THERMAL PRINTERS
Robert C. Meckstroth, Dayton, Stanley J. Sulek, Fairborn, Roger W. Morin, Waynesville, John H. Day, Dayton, Thomas M. Silcott, Xenia, and William E. Davies, Dayton, Ohio, assignors to The National Cash Register Company, Dayton, Ohio, a corporation of Ohio
Filed July 2, 1963, Ser. No. 292,351
10 Claims. (Cl. 101—93)

The present invention relates to printers and, more specifically, to a device for high-speed printing on a thermally-sensitive record material.

The majority of the current high-speed printers employ electromagnetically, mechanically, or pneumatically operated hammers to strike type slugs or type wheels. The resulting impact transfers the character embossed upon the type slug or type wheel to a sheet of record material through a transfer medium such as an inked ribbon. Regardless of the method employed to activate the hammers, there are a considerable number of mechanical linkages involved. Because of inertia inherent in these mechanical systems, the speed at which printers of this type may be operated is limited. Furthermore, the problems of maintenance are compounded as printers of this type become more complex.

A printer which is capable of performing a printing operation with no mechanical movement would, of course, obviate most of these undesirable features. A co-pending United States Patent application, Serial No. 234,668, of Hans Schroeder et al., filed November 1, 1962, and assigned to the same assignee, discloses a thermal printing head which is capable of marking a thermally-sensitive record material. A printer employing a thermal printing head of this type may print upon a thermally-sensitive record material with no mechanical motion required for the marking operation. Furthermore, the use of a dry, thermally-sensitive record material affords other desirable features, such as the elimination of the need for fluid developing or other processing of the record material. The desirability of a high-speed printer of this type which produces clean copy with no mechanical motion required for the actual marking operation is apparent.

It is, therefore, an object of the present invention to provide an improved high-speed printer.

It is another object of the present invention to provide an improved high-speed printer capable of marking a thermally-sensitive record material.

In accordance with this invention, a printer for marking a thermally-sensitive record material is provided wherein the record material is transported by and in cooperative relationship with a printing unit of the type capable of marking a thermally-sensitive record material as the printing unit is successively energized to thermally transfer selected characters to the record material.

Figure 2:
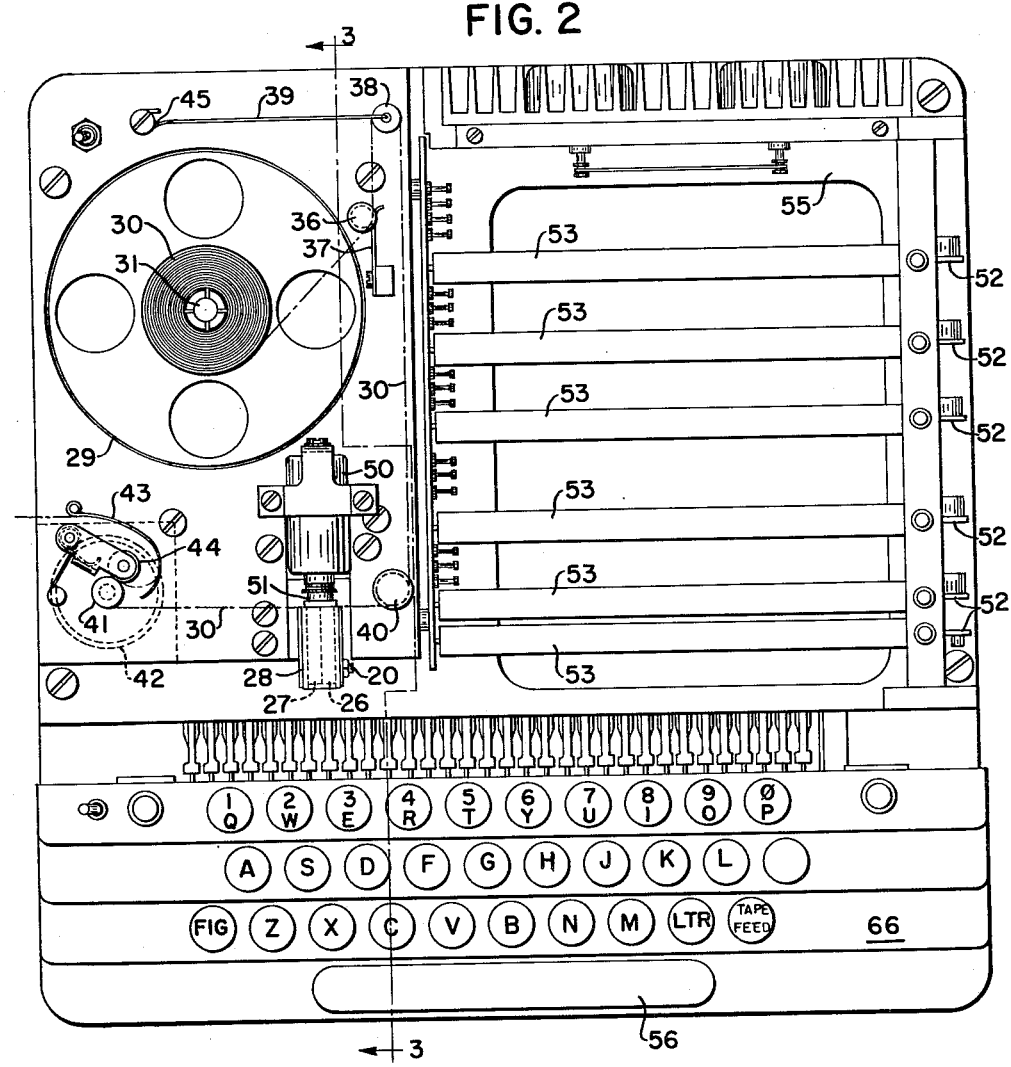
Figure 3:
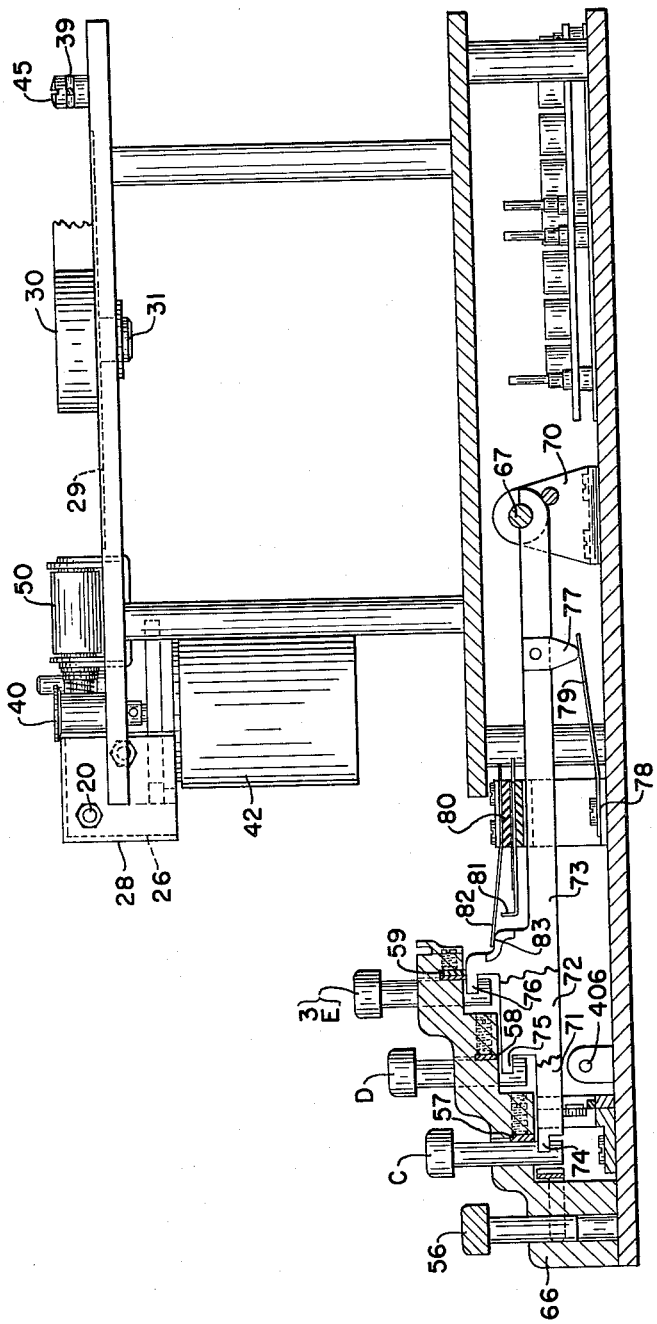
Figure 4:
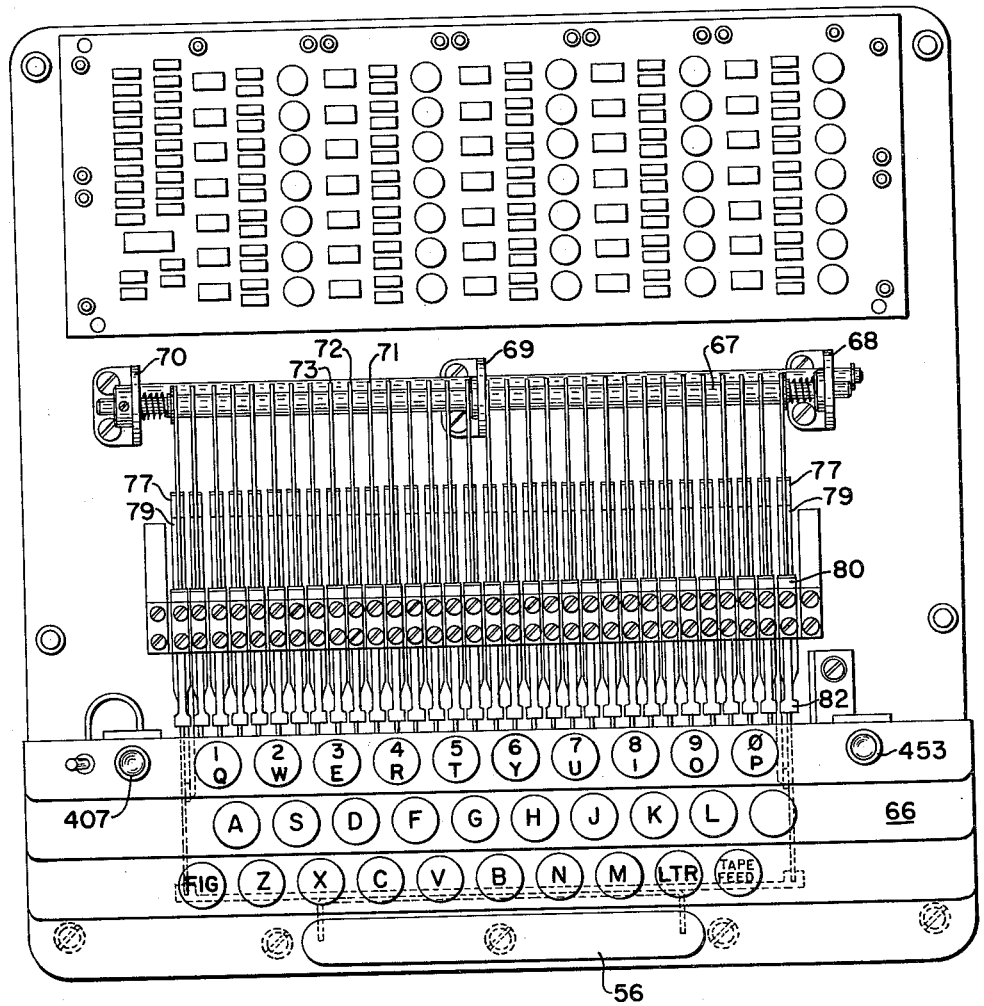
Figure 5:
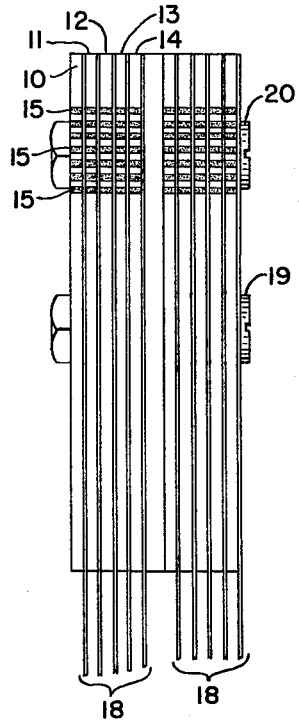
Figure 6:
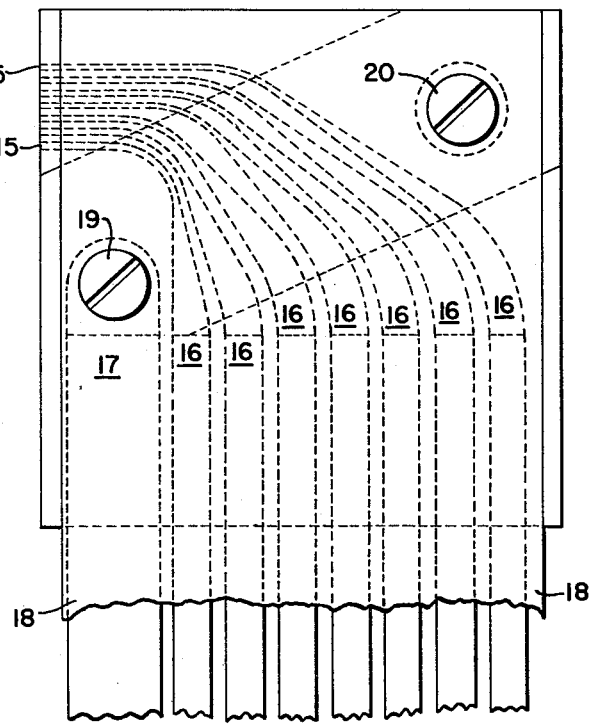
Figure 7:
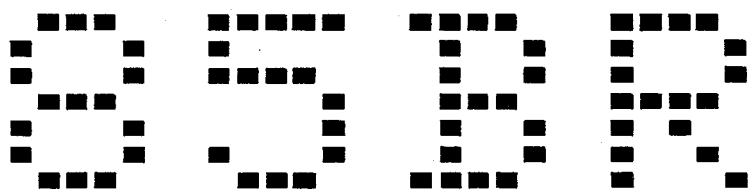
Figure 8:
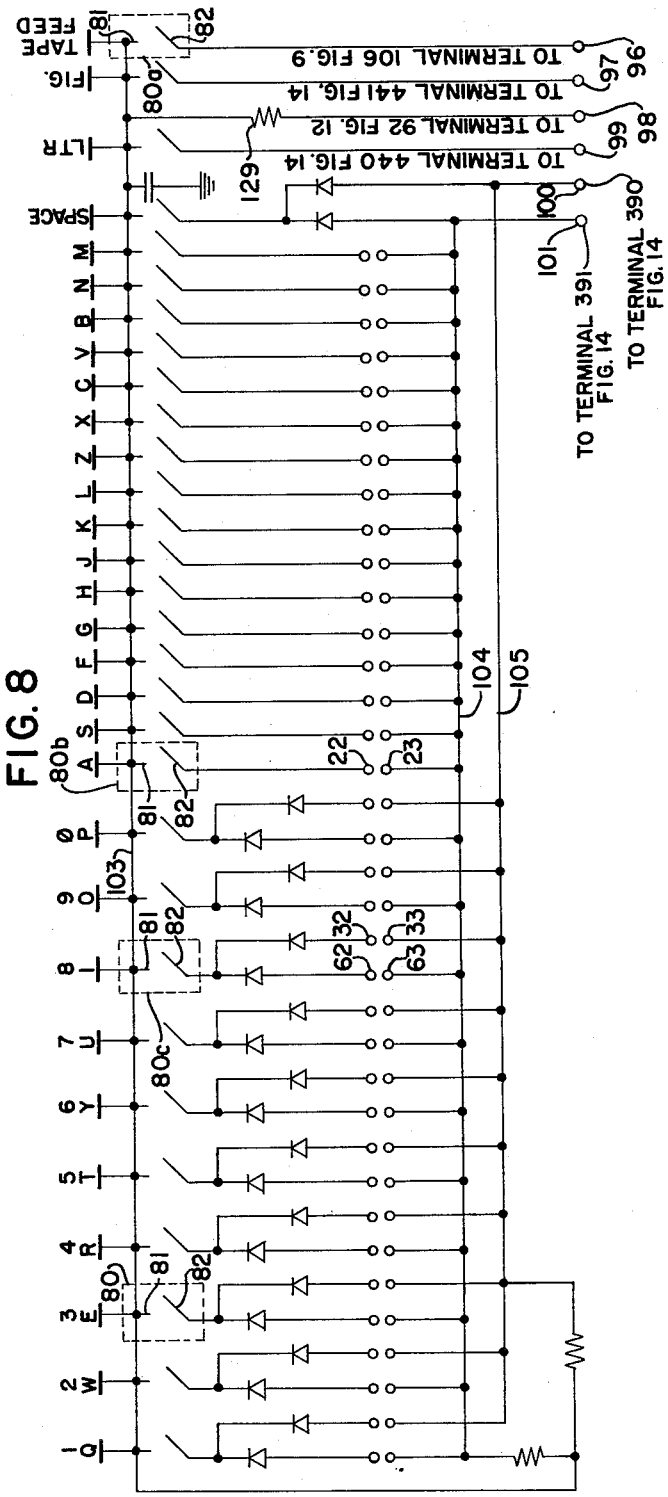
Figure 9:
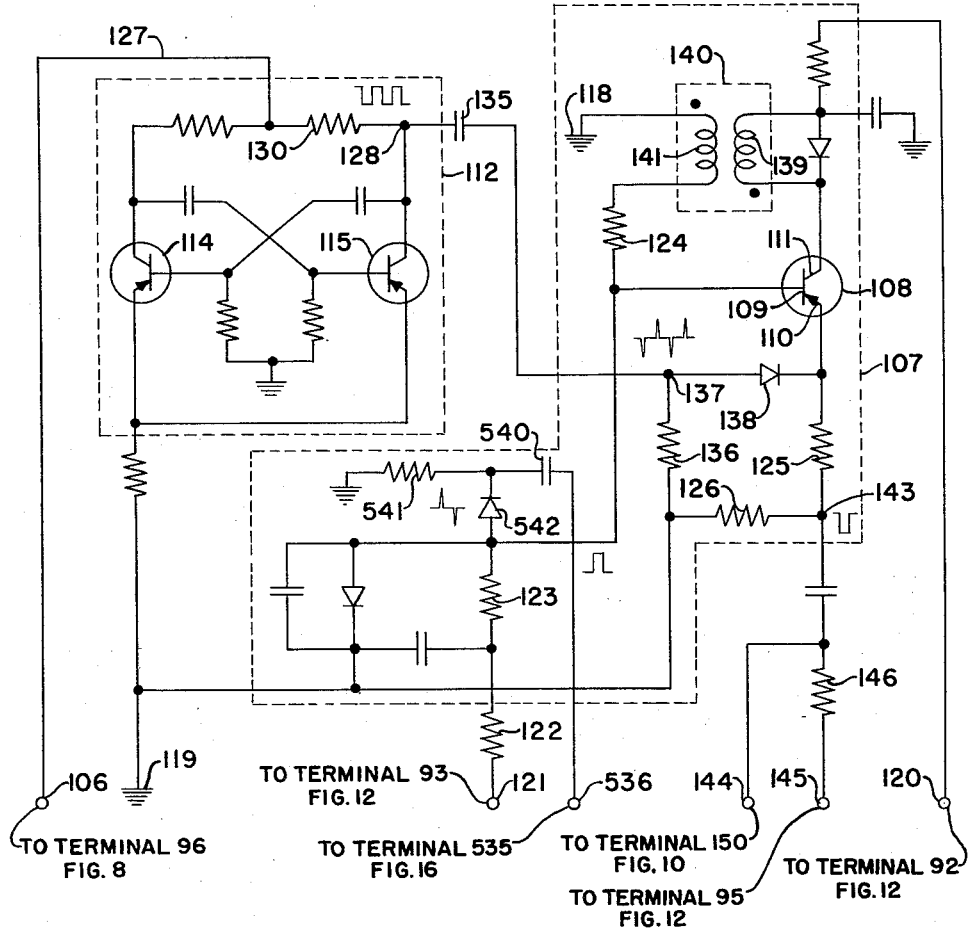
Figure 16:
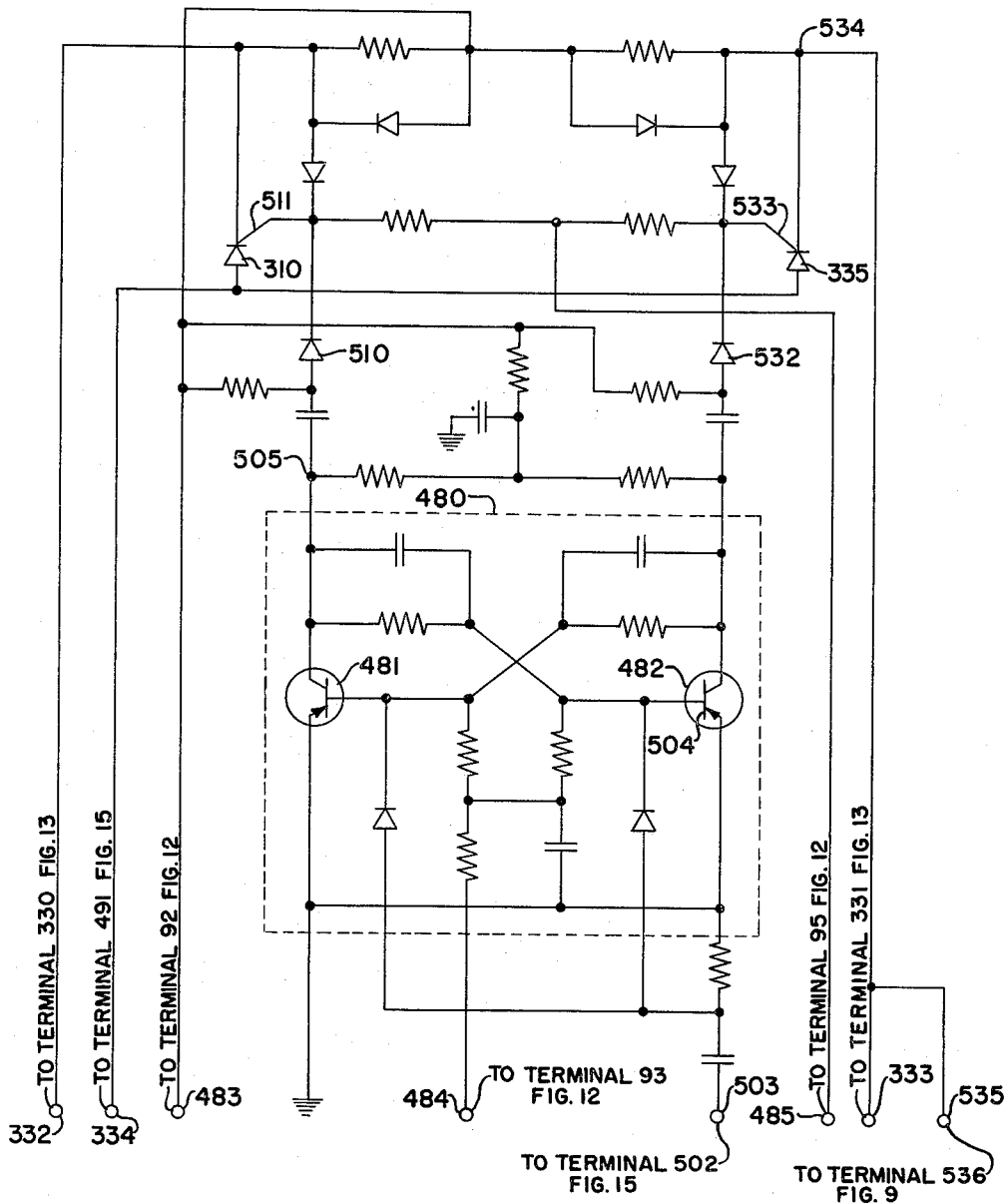
Figure 17:
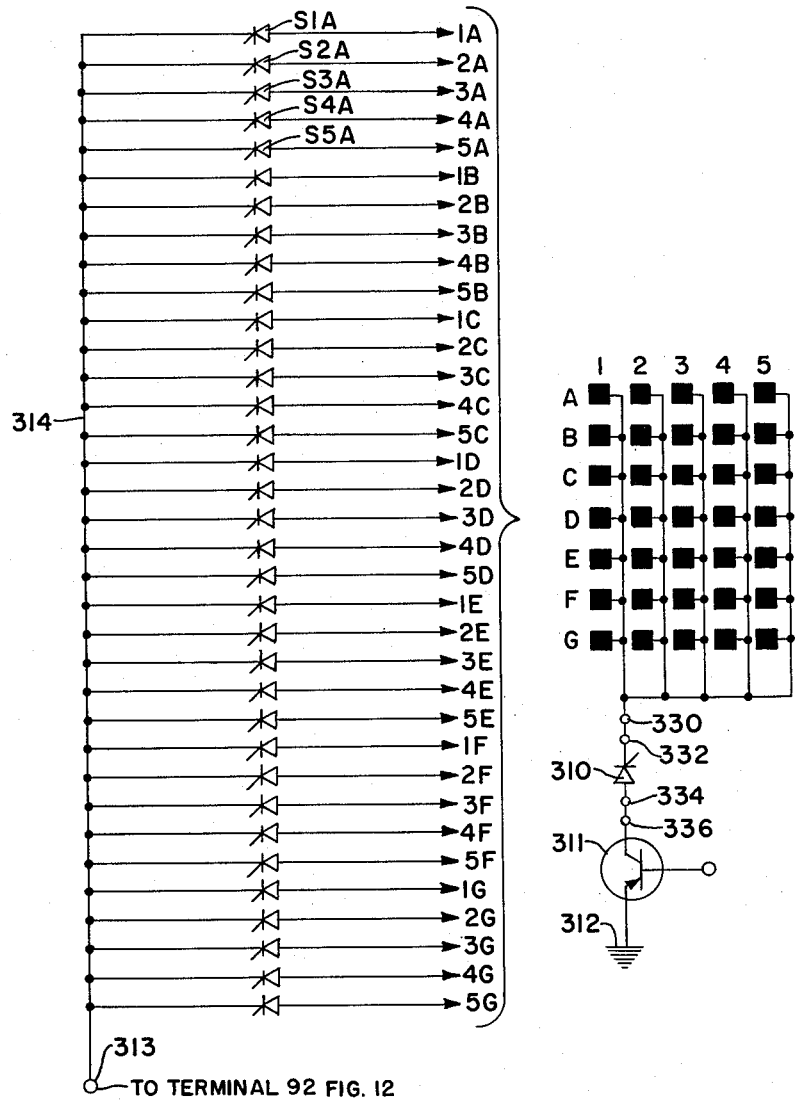
Figure 18:
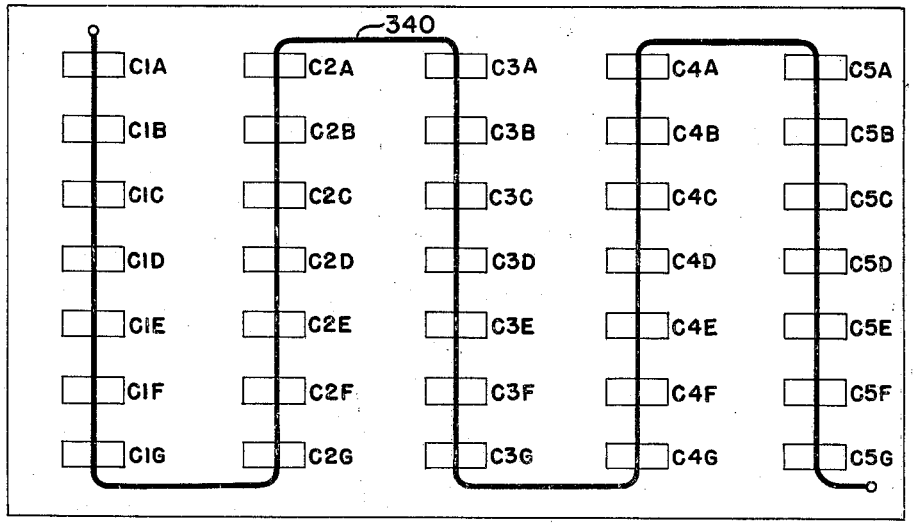
Figure 19:
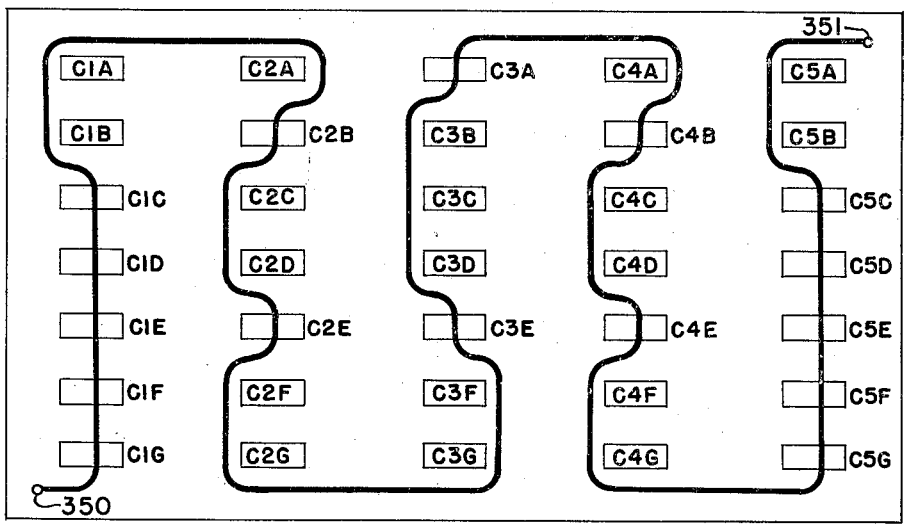

For a better understanding of the present invention, together with further objects, advantages, and features thereof, reference is made to the following description and accompanying drawings, in which:

FIGURE 1 is a side elevation view of the printer of this embodiment with the cover removed, FIGURE 2 is a top view of the printer of this embodiment with the cover removed, FIGURE 3 is a section view through FIGURE 2 taken along line 3—3 and looking in the direction of the arrows, FIGURE 4 is a section view through FIGURE 1 taken along line 4—4 and looking in the direction of the arrows, FIGURE 5 is an end view of two thermal printing heads grouped for parallel operation in the printer of this embodiment, FIGURE 6 is a side view of FIGURE 5, FIGURE 7 illustrates the characters as printed by the thermal printing head of FIGURES 5 and 6, FIGURE 8 schematically illustrates the keyboard input keys, the associated leaf-spring-type electrical switches, and the electrical interconnections therefor, FIGURE 9 schematically illustrates the circuitry which produces the record medium advance signals, FIGURE 10 schematically illustrates the circuitry which supplies power to the platen solenoid coils and the record medium advance step servo motor, FIGURE 11 schematically illustrates the energizing circuitry for the record medium advance step servo motor, FIGURE 12 schematically illustrates the power supply of the embodiment, FIGURE 13 schematically illustrates the print head units and the circuitry through which each may be energized, FIGURE 14 schematically illustrates the circuitry which initiates the print signal pulse, FIGURE 15 schematically illustrates the print head energizing circuitry, FIGURE 16 schematically illustrates the head select circuitry employed with multiple head operation, FIGURE 17 is a detailed schematic diagram of the resisitive element energizing circuitry, FIGURE 18 is a schematic diagram of the core matrix read-out winding, FIGURE 19 is a schematic diagram of the core matrix read-in winding for the letter "A,"

Figure 20:
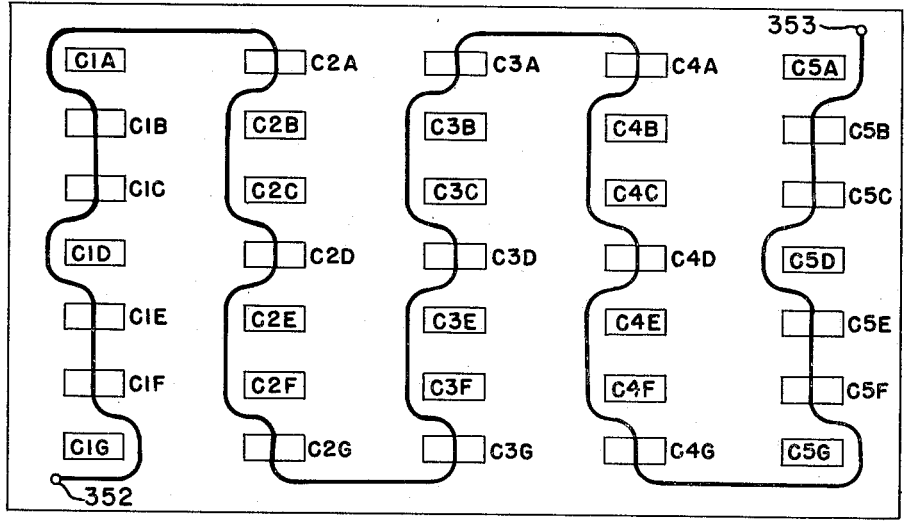
Figure 21:
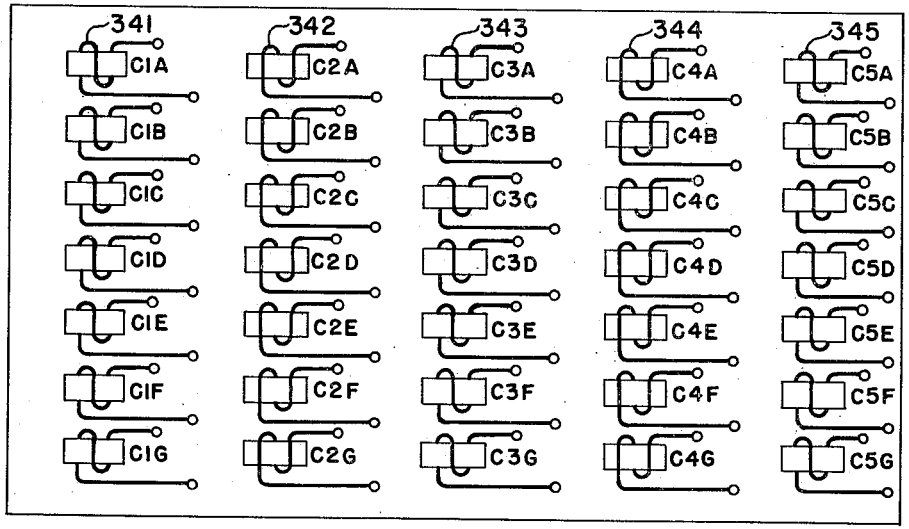

FIGURE 20 is a schematic diagram of the core matrix read-in winding for the number "8", FIGURE 21 is a schematic diagram of the core matrix sense windings, and FIGURE 22 is a table illustrating the cores of the core matrix to be threaded by the read-in winding of each character to be printed.

For purposes of illustrating the features of the present invention, and without intention or inference of a limitation thereto, the intelligence-entering device for the embodiment to be described herein will be a multiple-key, manually-operated keyboard.

To effect the printing of characters upon or the marking of a thermally-sensitive record material, one or more thermal printing heads of the type described in the aforementioned United States patent application may be employed. To show that printing heads of this type may be grouped and operated in parallel, the printer of the present invention will be described on the basis of both multiple and single printing head operation.

Thermal printing heads of this type, capable of marking a thermally-sensitive record material, include a plurality of resistive elements arranged in the form of a matrix of columns and rows upon a high-resistivity substrate material with a supply electrical conductor for each resistive element and a return electrical conductor common to all of the resistive elements. The application of an electrical current pulse to any of these electrical conductor pairs will produce in the corresponding resistive element a temperature rise of sufficient magnitude to produce a mark in the form of a dot on thermally-sensitive record material in cooperative relationship therewith. Therefore, by energizing, with an electrical current pulse, selected ones of these resistive elements of the matrix, the characters to be printed may be outlined as a series of dots, as illustrated in FIGURE 7, upon a thermally-sensitive record material in cooperative relationship therewith. Although not limited thereto, it has been found that all of the letters of the alphabet and the numerical digits may be readily formed by a printing head of this type having thirty-five resistive elements arranged in a matrix of five columns of seven resistive elements per column.

An example of commercially-available thermally-sensitive record material which may be marked by printing heads of this type is the thermally-sensitive type of papers manufactured by Minnesota Mining and Manufacturing Company which are marketed under the trademark "Thermo-Fax" paper.

One example of a printing head of this type is illustrated in FIGURES 5 and 6, where two print heads are shown grouped for parallel operation. To form a five-by-seven matrix of resistive elements, five high-resisitivity-material wafers 10, 11, 12, 13, and 14, each having seven resistive elements 15, are arranged in a stacked array as shown in FIGURES 5 and 6. As both print heads are identical, only one has been referenced in these figures, in the interest of drawing clarity. Separate supply electrical conductors 16 and a common return electrical conductor 17 are provided for each resistive element on each wafer for a total of forty conductors, thirty-five supply and five common, for each printing head. These supply and return conductors may be of any low-resistance conductive material, such as silver or copper, and may be applied to the surface of the wafers by the use of well-known printed circuit or vacuum deposition techniques. To extend these conductors beyond the edge of each wafer, commercially-available strip conductors 18 may be electrically connected to the conductors carried by the respective wafers. To provide electrical insulation between adjacent resistive elements and adjacent supply and return conductors, thin, flexible dielectric spacers may be inserted between adjacent wafers. The separate wafers may be firmly secured together to form a printing head by bolts 19 and 20. It is to be specifically understood, however, that alternate arrangements and matrices of more or less resistive elements may also be employed without departing from the spirit of this invention.

In the printer to be described herein, two of these printing heads, 26 and 27, grouped for parallel operation as shown in FIGURES 2 and 3, are employed and are contained within a housing 28 for mechanical protection, as shown in FIGURES 2 and 3.

To advance the record medium by and in cooperative relationship with the printing heads 26 and 27, a record medium transport mechanism (FIGURES 2 and 3) is provided. Without intending or inferring a limitation thereto, this embodiment of the present invention is arranged to be a strip printer; that is, the type which serially prints the characters upon a strip or tape of record medium as it is advanced across the thermal printing heads. A reel 29 of thermally-sensitive record medium tape 30 is placed upon a spindle 31, about which it is free to rotate. The free end of the tape 30 is threaded around an idler roller 36, against which it is firmly held by a pressure spring 37, around a second idler roller 38, rotatably mounted upon the free end of a spring 39, around an idler roller 40, by the printing heads 26 and 27, and around the capstan 41 of a step servo motor 42, from which it is directed beyond the edge of the printer by a guide member 43. The step servo motor 42 is of the type which may be successively stepped by successive energizations, the shaft and capstan 41 of which revolves through a ninety-degree arc with each step, and is commercially marketed by IMC Magnetics Corporation, of Maywood, California, United States of America. To advance the tape by the printing heads 26 and 27, therefore, the step servo motor 42 is energized at the proper time during the printing operations in a manner to be explained later. To provide sufficient frictional engagement between the tape 30 and the capstan 41 to permit the capstan 41 to draw the tape 30 by the printing heads 26 and 27 as it is successively revolved through a series of ninety-degree arcs, a pinch roller 44, which firmly forces the tape 30 into intimate contact with the surface of the capstan 41, is provided. As the torque of the step servo motor 42 is very low, this motor may be unable to overcome the inertia of the tape reel 29 over the short duration of time between steps which is necessary to advance the tape at high printing speeds. To assure that the tape is advanced at a rate compatible with the printing speed, a low-inertia spring 39 and idler roller 38 are provided. The torque of the motor 42 is of a sufficient magnitude to quickly distort the spring 39 in a clockwise direction about its fulcrum point 45 each time the motor steps and advances the tape by the printing heads 26 and 27, thereby shortening the tape lop around the idler roller 38. After the motor 42 has stepped, the returning force of the spring 39 is of sufficient magnitude to overcome the inertia of the tape reel 29. Therefore, as the spring returns to its normal position between steps of the motor 42, tape is unreeled from the reel 29 by the returning force of this spring and is taken up by the resulting lengthening of the tape loop around the idler roller 38. The proper tensioning of the tape 30 is, of course, maintained by the pressure spring 37 and the idler roller 36, between which the tape is threaded.

To assure that the tape 30 is in cooperative relationship with the printing heads 26 and 27 during the print operation, a platen solenoid 50 is provided, and the tape 30 is threaded between the printing heads 26 and 27 and a platen on the free end of the armature 51 of the platen solenoid 50. The armature 51 of the solenoid 50 is spring biased in a direction to normally firmly force the platen against the tape 30, which, in turn, forces the tape 30 into initmate contact with the printing heads 26 and 27 at all times except during the step or tape advance operation. During this operation, the solenoid is energized, in a manner to be explained later, thereby releasing this force, and the tape then is free to be advanced by energizing the motor 42. In this regard, the force exerted by the spring which normally biases the armature 51 of the solenoid 50 against the tape 30 and the printing heads 26 and 27 may be of sufficient magnitude to positively assure an intimate contact therebetween, as this force is released by the energization of the solenoid 50 during tape advance. An alternative method would be the use of a pressure spring, such as the spring 37, to maintain this contact. However, since the force of a spring of this type would not be released during the advancement of the tape, it must be sufficiently small to permit tape advancement.

FIGURE 1 is a side elevation view of the printer of this embodiment with the cover removed. Most of the necessary electronic circuitry is mounted upon conventional printed circuit boards 52, which are held in place by conventional grooved holders 53, which are, in turn, supported by members 54 and 55. In the interest of reducing drawing complexity, the electrical interconnections between these boards have not been shown, as they are set forth schematically and will be explained in detail later.

To enter intelligence into the printer of this embodiment, a multiple-key keyboard is provided. As shown in FIGURES 1 through 4, these keys are arranged in the form of a conventional typewriter keyboard with three rows of keys each, at different levels. An elongated space bar 56 is also provided. As with conventional typewriters, certain ones of these keys correspond to characters to be printed and are hereinafter referred to as character keys, while other ones of these keys correspond to certain operations which are necessary for proper printing and are hereinafter referred to as operation keys. In FIGURES 2 and 3, each of the character keys has been identified by the character or characters to which each corresponds, and each of the operation keys has been identified by the operation to which each corresponds.

The printer of this embodiment is arranged to print each character of a first character group which includes all of the letters of the alphabet and each character of a second character group which includes all of the numerical digits, for a total of thirty-six different characters. As there are only thirty keys on the keyboard, it is apparent that some of these keys, hereinafter termed dual character keys, must correspond to two different characters. Therefore, it is necessary to provide for character group selection, so that these dual character keys may be selectively enabled to effect the printing of the desired one of the two characters to which each corresponds. In this embodiment, one of the keys is employed to select the character group including the letters of the alphabet, and a second key is used to select the character group including the numerical digits. These character-group-selecting operation keys are labeled "LTR" and "FIG" in FIGURES 2 and 4. With this arrangement, it is convenient to have each of the plurality of dual character keys correspond to a single character of each character group; that is, a letter and a numeral, while the remainder of the character keys each correspond to a single character of the character group which includes the letters of the alphabet. It may be noted, therefore, that each of the ten keys of the top row (FIGURES 2 and 4) corresponds to an alphabetical letter and a numerical digit.

Upon the depression of the "LTR" operation key, the ninth key of the bottom row, an electrical circuit, which will be explained in detail later, is energized, which enables each of the ten dual character keys to effect the printing of the alphabetical letter to which each corresponds upon operation or depression. The other character keys are unaffected by this enabling circuit. Upon the depression of the "FIG" operation key, the first key of the bottom row, a second electrical circuit, also to be explained in detail later, is energized, which enables each of the ten dual character keys to effect the printing of the numerical digit to which each corresponds upon operation or depression. The operation of the "FIG" operation key completely disables the remainder of the character keys, which then are incapable of effecting the printing of the respective characters to which they correspond until the "LTR" operation key is again depressed.

The mechanical features of this embodiment are most clearly shown in FIGURES 3 and 4, of which FIGURE 3 is a section view through FIGURE 2 taken along line 3—3 and looking in the direction of the arrows.

To support and locate the keys of the keyboard, a keyboard casting member 66, of any suitable material, is provided. The member 66 may be drilled for each key, the diameter of each bore being of such a dimension as to snugly accommodate the respective key stems and permit free vertical movement thereof.

The keys may be of the type having a "D" section stem with an enlarged head portion or tip. To prevent rotation of the keys about the vertical axes when located in the respective key bores of the member 66, small tabs 57, 58, and 59, of a soft material such as aluminum, are placed in each key bore and located to engage the flat portion of the "D" section key stems.

Associated with each key of the keyboard is a respective key lever arm, which may be pivoted about a shaft 67, which is rigidly supported by brackets 68, 69, and 70 (FIGURE 4) upon the depression of the associated key. As there are thirty-two identical key lever arms in this embodiment, one for each of thirty keys and two for the space bar, only three have been referenced in FIGURES 3 and 4 by the numerals 71, 72, and 73. It may be noted that the two end key lever arms are associated with and operated by the space bar 56. In FIGURE 3, it may be noted that the character keys corresponding to the letters "C" and "D" and the dual character key corresponding to the letter "E" and the numeral "3" are associated with the key lever arms 71 and 72, shown broken away, and 73, respectively. The end of each key stem is notched to accommodate a pawl of the associated lever arm. Upon the depression of a key, therefore, the associated lever arm is rotated counter-clockwise through a small arc about the shaft 67.

As the stem ends of the keys of different rows are located at different vertical levels and at different horizontal distances from the shaft 67, each of the lever arms may have three pawls, one for each row of keys, each of which is arranged to be accommodated by a notch in the stem of a key of the respective row. The pawl 74 of each lever arm is arranged to be accommodated by notches in the stems of keys in the lowest row; the pawl 75 of each lever arm is arranged to be accommodated by notches in the stems of keys in the center row; and the pawl 76 of each lever arm is arranged to be accommodated by notches in the stems of keys in the top row.

To return a depressed key to its normal position upon release, a return leaf spring 79 is provided for each key lever arm. Upon the depression of a key, the resulting counter-clockwise rotation of the associated key lever arm about the shaft 67 is transferred to the associated return spring, through a bearing 77, which distorts the return spring clockwise about its fulcrum 78. Upon the release of the depressed key, the returning force of the return spring revolves the associated lever arm clockwise about the shaft 67, which raises the depressed key to its normal position.

Also associated with each key lever arm is a conventional leaf-spring-type electrical switch 80, having a stationary contact 81 and a spring contact 82, which is biased to close the contacts. The spring contact 82 engages a shoulder 83 on the respective key lever arm, which forces the spring contact 82 into its open position when the associated key lever arm and key are in the normal position. When the associated key lever arm is rotated about the shaft 67 upon the depression of the associated key, the spring bias of the spring contact 82 closes the contacts of the switch 80, completing an electrical circuit which effects the printing of the character corresponding to the depressed key in a manner now to be explained.

In a practical application of this embodiment, a conventional regulated direct current power supply, as schematically set forth in FIGURE 12, was employed. A separate source, not shown, of unregulated direct current potential, which may vary in magnitude by as much as eight volts, is applied to a negative input terminal 90 and a positive input terminal 91. This unregulated direct current potential is regulated by the Zener diode and transistor networks, which are conventional in design and form no part of this invention, and is delivered to an output terminal 92 as a substantially constant negative potential and to an output terminal 93 as a substantially constant positive potential, with the applied potential magnitude remaining within the allowable minimum and maximum limits as determined by the design of the regulating networks. The output terminal 94 is the common supply potential terminal, which may be point of reference potential or ground, and the potential at the terminal 94 is of a negative polarity which substantially follows the input potential magnitude. With this embodiment, the regulating networks were designed to deliver constant potentials of negative twenty volts to the terminal 92 and positive two volts to the terminal 93, each in respect to the common terminal 94, with a variation in magnitude of the unregulated input potential between twenty-four and thirty-two volts. It is to be specifically understood that these potential values have been recited as examples only, as other potential values may be employed without departing from the spirit of the invention. Also, the source of unregulated direct current potential need not be separate but may be included within the printer package. These alternatives are, of course, discretionary and are not to be construed as limitations.

In FIGURE 8, the keyboard input keys, the associated leaf-spring-type electrical switches, and the electrical interconnections therefor are schematically set forth. As the reference numerals 80, 81, and 82 identify these electrical switches associated with each key and the stationary and movable contacts thereof, respectively, in FIGURES 1, 2, 3, and 4, these same reference numerals denote like parts of the schematic diagram of FIGURE 8. The several different ones of these switches and contacts which enter into the description of the electrical circuitry will be distinguished from each other by letter postscripts.

The terminal 98 of this figure is connected to the regulated negative potential terminal 92 of the power source of FIGURE 12, which places a substantially constant negative potential upon the bus 103, hereinafter referred to as the regulated negative potential bus. Upon the depression of any key and the resulting closure of the contacts of the associated switch 80, therefore, an electrical circuit is completed from the regulated negative potential terminal of the power source to the associated circuitry of the printer, thereby providing input intelligence to effect printing of the character to which the depressed key corresponds or to effect the operation to which the depressed key corresponds.

Frequently, it is desirable to advance the record material without printing or successively depressing the space bar. The intelligence to perform this operation is entered into the printer of this embodiment by depressing the keyboard operation key labeled "Tape Feed" in FIGURE 8. Upon the depression of this operation key, the contacts of the associated electrical switch 80a are closed, which places the regulated negative potential of the bus 103 upon the terminal 96, which is connected to the terminal 106 of FIGURE 9.

FIGURE 9 sets forth schematically the circuitry which produces the record medium advance signals which effect the advancement of the record medium in response to the depression of the "Tape Feed" operation key or the depression of the space bar 56 or the print operation. As the present embodiment is a strip printer, the record medium advance will hereinafter be termed "tape advance." As has previously been brought out in the description of the tape transport mechanism, the strip of record medium tape is advanced in steps by successively energizing a step servo motor 42, the shaft of which revolves ninety degrees with each energization. To produce the record medium advance signals which effect the energization of the step servo motor with each signal, a conventional one-shot oscillator 107, including a type PNP transistor 108 having the usual base 109, emitter 110, and collector 111 electrodes, is employed. In a manner to be explained later, the one-shot oscillator 107 also produces a record medium or tape advance signal in response to a printing operation or to the depression of the space bar 56. To advance the record medium tape without printing and without successively depressing the space bar, the "Tape Feed" operation key may be depressed and held until the tape has been advanced as required. The signals to which the one-shot oscillator 107 responds during this operation are produced by a conventional free-running multivibrator 112, having two type PNP transistors 114 and 115. Until the paper feed operation key is depressed, there is no bias potential upon the respective collectors of these transistors; therefore, the multivibrator 112 is normally inoperative.

The terminal of this figure is connected to the regulated negative potential terminal 92 of the power source of FIGURE 12, which applies a substantially constant negative potential forward bias to the collector electrode 111 of the transistor 108. The terminal 121 is connected to the regulated positive potential terminal 93 of the power source of FIGURE 12, which applies a bias potential of a value more positive than ground, as determined by the potential divider network including series resistors 122, 123, and 124 connected between the terminal 121 and point of reference or ground potential 118, to the base 109 of the transistor 108. The emitter electrode 110 of the transistor 108 is at substantially ground potential, being connected to point of reference or ground potential 119 through series resistors 125 and 126. As the base electrode 109 is normally more positive than the emitter electrode 110 of the transistor 108, a condition which does not satisfy the base-emitter bias requirements for conduction through a type PNP transistor, the transistor 108 is normally non-conducting.

The negative polarity bias potential applied to the respective collector electrodes of the transistors 114 and 115 of the multivibrator 112 from the bus 103 of FIGURE 8, through the closed contacts of the switch 80a, terminal 106 of FIGURE 9, and bus 127, biases this multivibrator for operation, and it begins oscillation, which continues as long as the "Tape Feed" operation key is maintained depressed. In the practical application, the frequency of the multivibrator 112 was designed to be 125 cycles per second. This frequency may, of course, be altered to meet requirements without departing from the spirit of the invention. The output signal at point 128, taken from the collector electrode of the transistor 115 of the multivibrator 112, is of a square wave form which alternates between substantially ground potential, when the transistor 115 is conducting, and a negative potential of a magnitude determined by the potential magnitude on the bus 103 of FIGURE 8, when the transistor 115 is not conducting.

This square wave output signal from point 128 is differentiated by the combination of capacitor 135 and resistor 136 and appears as a series of negative and positive going spikes at the junction point 137 of the capacitor 135 and the resistor 136. The positive going spikes appearing at point 137 are applied to the emitter 110 of the one-shot oscillator transistor 108 through the diode 138. This positive going potential spike raises the potential bias on the emitter 110 to a magnitude which is more positive than the bias potential on the base 109, a condition which satisfies the base-emitter bias requirements for conduction through a type PNP transistor, and the transistor 108 conducts. As the transistor 108 begins conduction, the current flow through the coil 139 of the transformer 140 induces a potential in its coil 141. The coils of the transformer 140 are polarized in such a manner that the negative polarity induced potential is applied to the base electrode 109 of the transistor 108, which maintains the transistor 108 in a state of conduction after the short positive going potential spike is removed from the emitter electrode 110. The transistor 108 continues to conduct until the current flow through the coil 139 of the transformer 140 becomes constant. At this time, there is no potential induced in the coil 141, the induced negative polarity bias potential is removed from the base electrode 109 of the transistor 108, and the transistor 108 is biased to non-conduction, as the bias on the emitter electrode 110 is of a potential more negative than the bias potential on the base electrode 109. The transistor 108 remains non-conducting until the next positive going potential spike appears at point 137, and the cycle just described is repeated. These cycles continue during the time that the multivibrator 112 oscillates, as determined by the length of time the "Tape Feed" operation key is maintained depressed. With each cycle of one-shot oscillator 107, an output signal pulse which goes from a substantially ground potential, during the period of non-conduction of the transistor 108, to a negative polarity potential, during the period of conduction of the transistor 108, appears at point 143. Therefore, a series of these signals appear at point 143 during the time the "Tape Feed" operation key is maintained depressed. Without intending or inferring a limitation thereto, the duration of each of these pulses in the practical application was approximately fifty micro-seconds. These negative going pulses appear as record medium advance signal pulses at output terminal 144, which is connected to terminal 150 of FIGURE 10.

FIGURE 10 schematically sets forth the circuitry which supplies power to the coil of the platen solenoid 50 and to the step servo motor 42 (FIGURES 2 and 3) in response to the short-duration negative going record medium advance signal pulses produced by the one-shot oscillator 107 of FIGURE 9, which appear at the input terminal 150. Because these record medium advance signal pulses affect gates which determine the coil of the step servo motor 42 to be energized, to be explained in connection with the description of FIGURE 11, they must be of short duration. However, these pulses are of insufficient duration to operate the step servo motor or the platen solenoid; therefore, the circuitry of FIGURE 10 is necessary to effectively extend the duration of these pulses.

Terminal 151 of FIGURE 10 is connected to the regulated positive potential terminal 93 of the power source of FIGURE 12 and through line 152 and series resistors 153 and 154 to terminal 150. Terminal 150 is connected to output terminal 144 of FIGURE 9 and, through a resistor 146 and terminal 145 thereof, to the unregulated negative potential terminal 95 of the power source of FIGURE 12, which provides a base bias potential circuit for the base electrode 155, connected to the junction of resistors 153 and 154, of type NPN transistor 160. The emitter electrode 161 of the transistor 160 is connected through a terminal 163 to the unregulated negative potential terminal 95 of the power source (FIGURE 12). Therefore, the base electrode 155 of the transistor 160 is more positive than its emitter electrode, a condition which satisfies the base-emitter bias requirements for conduction through a type NPN transistor. The terminal 164 is connected to the regulated positive potential terminal 93 of the power supply of FIGURE 12 through terminals 165 and 166 of FIGURE 11, which applies a positive bias potential upon the collector electrode 162 of the transistor 160. The terminal 166 of FIGURE 11 is connected to the terminal 165 of FIGURE 11 through any of the parallel combinations of series resistor-diodes, 167–168, 169–170, 171–172, or 173–174. As all of the bias requirements for conduction through a type NPN transistor are satisfied, the transistor 160 is normally conducting.

Terminal 180 of FIGURE 10 is connected to the regulated negative potential terminal 92 of FIGURE 12, which provides a charging circuit for the capacitor 181 which may be traced from terminal 151, connected to the regulated positive potential terminal 93 of FIGURE 12, through line 152, resistor 182, resistor 183, and capacitor 181 to terminal 180. When the capacitor 181 has charged to a potential of sufficient magnitude to break down the Zener diode 185, this diode conducts, and a circuit path is completed from the terminal 151 to the terminal 180 through resistor 182, resistor 183, Zener diode 185, and resistor 186. With the Zener diode 185 conducting, the potential of point 187 goes positive.

Also connected between the terminals 151 and 180 are two silicon controlled rectifiers 190 and 191, in parallel. Devices of this type operate in a manner similar to a gas-filled triode. That is, these devices conduct only upon the application of a positive polarity signal to the control electrode and, after being triggered to conduction, continue to conduct until the applied potential is removed or the polarity reversed. The positive polarity potential which appears at point 187 during the conduction of the Zener diode 185 is impressed upon the control electrode 192 of the controlled rectifier 190. The controlled rectifier 190 is, therefore, normally conducting, and the controlled rectifier 191 is normally not conducting, as its control electrode 193 receives no positive potential signal at this time.

With the controlled rectifier 190 conducting, a charging circuit is established for the capacitor 194 which may be traced from terminal 151, through line 152, resistor 195, capacitor 194, and conducting controlled rectifier 190 to terminal 180. As looking at FIGURE 10, the charge on the right plate of the capacitor 194 is of a positive polarity, and the charge on the left plate is of a negative polarity.

The emitter electrode 201 of the type PNP platen solenoid control transistor 200 is connected to a point of reference or ground potential 196, while the collector electrode 202 thereof is connected to the terminal 163 through a series resistor 204 and the platen solenoid coil 49, in parallel, which forward-biases the transistor 200.

The base electrode 203 of the transistor 200 is connected to the terminal 151 through a resistor 205, which places a positive bias potential upon this electrode, a condition which does not satisfy the base-emitter bias requirements for conduction through a type PNP transistor. The transistor 200, therefore, is normally not conducting, and the coil 49 of the platen solenoid 50 is normally not energized.

As will be later explained with the description of FIGURE 11, one of the supply leads for the step servo motor 42 is returned to the regulated positive potential terminal 93 of the power source of FIGURE 12 through terminal 251 of FIGURE 11, terminal 207 of FIGURE 10, type PNP transistor 210 and parallel resistor 214 and terminal 151. The other supply lead for the step servo motor 42 is connected to the unregulated negative potential terminal 95 of the power supply of FIGURE 12 through terminal 242 of FIGURE 11, in which figure the connections of the four coils 42a, 42b, 42c, and 42d, of the step servo motor 42, relative to the supply lines therefor, are schematically set forth. Because at least one of these coils is always connected across the supply potential, as will be brought out later, it is necessary to reduce the supply potential applied to the conducting coil during the periods that the step servo motor 42 is at rest, to prevent overheating and coil damage. To do this, the resistor of FIGURE 10 is inserted in series during the periods when the step servo motor is at rest. The inclusion of this resistor in the servo motor supply circuit reduces the supply potential to a magnitude which is low enough to maintain the heating of the conducting coil of the step servo motor 42 within tolerable limits.

To remove the resistor 214 from the servo motor supply line during the tape advance operation, a type PNP transistor 210 (FIGURE 10) is connected in shunt thereacross. During the periods that the step servo motor 42 is at rest, the transistor 210 is in a state of non-conduction, and the resistor 214 is included in series with the step servo motor supply circuit. Because it is imperative that the transistor 210 be maintained in a state of non-conduction during the periods that the servo motor 42 is at rest, a type NPN isolating transistor 215 is included in the base bias circuit of the transistor 210. The collector electrode 216 of the transistor 215 is connected, through series resistors 219 and 220, to the terminal 151, which places a forward collector bias on the transistor 215, as this terminal is connected to the regulated positive potential terminal 93 of FIGURE 12. The emitter electrode 217 is connected to the terminal 180, and the base electrode 218 is connected to the junction of series resistors 225 and 226. As the controlled rectifier 190 is conducting, the resistors 225 and 226 constitute a potential divider which is connected between the point 221 and the terminal 180, through the controlled rectifier 190. The potential of the point 221 is maintained negative relative to the emitter electrode 217 of the transistor 215 by the potential drop of two forward conducting diodes in series, through the bleeder network from the terminal 180 through the diodes 223 and 224 and the resistor 227 to the terminal 163. Relative to the ohmic value of the resistor 225, the ohmic value resistor 226 is selected to produce a bias potential upon the base electrode 218 which is more negative than the regulated negative potential applied to the emitter electrode 217, a condition which does not satisfy the base-emitter bias requirements for conduction through a type NPN transistor. Therefore, the transistor 215 is normally not conducting.

The emitter electrode 211 of the transistor 210 is connected to the terminal 151, and the base electrode 212 is connected to the same terminal through a resistor 220. With the transistor 215 not conducting, therefore, these electrodes are at substantially the same potential, a condition which does not satisfy the base-emitter bias requirements for conduction through a type PNP transistor. Therefore, the transistor 210 is normally not conducting.

The appearance of a negative going record medium advance signal pulse from the one-shot oscillator 107 of FIGURE 9, as previously described, upon the terminal 150, connected to the terminal 144 of FIGURE 9, overcomes the normal positive potential bias on the base 155 of the transistor 160 and drives the base more negative than the emitter electrode 161 thereof. As this condition does not satisfy the base-emitter bias requirements for conduction through a type NPN transistor, the transistor 160 is turned off by each record medium advance signal pulse appearing at terminal 150 and is held off for the duration of the pulse.

Upon the cutoff of transistor 160, the potential at point 230 rises from a negative value substantially equal to the value of the potential appearing at the unregulated negative potential terminal 163 to a positive potential, at which value it remains over the duration of the record medium advance signal pulse. As the transistor 160 conducts upon the expiration of the record medium advance signal pulse at terminal 150, the potential at point 230 returns to its original negative value. Therefore, a positive going pulse of a duration equal to that of the record medium advance signal pulse appears at point 230 with each record medium advance signal pulse appearing at terminal 150.

This positive going pulse is differentiated by the capacitor 231 and resistor 232 combination, and the leading edge appears as a positive going potential spike at point 233. The resulting positive going potential spike is applied to the control electrode 193 of the controlled rectifier 191, which is thereby triggered to conduction.

With the controlled rectifier 191 conducting, a discharge path for the capacitor 194 is established through the controlled rectifier 191 to the terminal 180, and the positive charge on the right plate of the capacitor 194 overcomes the negative potential at point 234, which reverse biases the conducting controlled rectifier 190 to cutoff. After the capacitor 194 has discharged, it is charged in the reverse direction through a charging circuit which may be traced from terminal 151, through line 152, resistor 182, capacitor 194, and conducting controlled rectifier 191 to terminal 180. As looking at FIGURE 10, the left plate of the capacitor 194 is now charged with a positive polarity potential.

With the controlled rectifier 191 conducting, the potential at point 235 is of a negative polarity and of a magnitude substantially equal to that appearing at terminal 180 less the drop across the resistor 206. This negative potential is applied to the base 203 of the type PNP transistor 200, thereby biasing the transistor 200 to conduction. With the transistor 200 conducting, emitter-collector current flow therethrough energizes the coil 49 of the platen solenoid 50, thereby removing the platen pressure from the record medium tape during the record medium advance operation.

With the controlled rectifier 190 not conducting, the potential at point 240 is of a positive polarity, which is applied to the base electrode 218 of the type NPN transistor 215, thereby biasing the transistor 215 to conduction.

The polarity of the potential at point 241 goes negative during the period when the transistor 215 is conducting, thereby biasing the type PNP transistor 210 to conduction. With the transistor 210 conducting, the servo motor supply circuit series resistor 214 is effectively removed from the circuit by the low impedance shunt path through the conducting transistor 210. Under these conditions, substantially full supply circuit potential is applied to and energizes the proper coil of the step servo motor 42, and the armature of this motor revolves one ninety-degree step, which advances the record medium in a manner previously described in the description of the transport mechanism. The selection of the proper coil to be energized will be explained in the description of the circuitry of FIGURE 11.

When the controlled rectifier 190 is biased to non-conduction by discharging capacitor 194, a charging circuit, as previously described, is re-established for the capacitor 181. Upon the breakdown and conduction of the Zener diode 185 when the capacitor 181 has become sufficiently charged, the resulting positive polarity potential appearing at point 187 again triggers the controlled rectifier 190 to conduction in a manner previously described. The conduction of the controlled rectifier 190 also establishes a discharge path for the capacitor 194 through the conducting controlled rectifier 190 to the terminal 180. The positive charge on the left plate of the capacitor 194 overcomes the negative potential at point 234, and the potential at this point goes positive during discharge, thereby reverse biasing the conducting controlled rectifier 191 to cutoff. After the capacitor 194 has discharged, it is again charged in the initial direction through the charging circuit previously described. When the controlled rectifier 190 is conducting and the controlled rectifier 191 is not conducting, the potential at point 235 goes positive, thereby base-biasing the transistor 200 to non-conduction, and the potential at point 240 goes negative, thereby base-biasing the transistor 215 to cutoff. With the transistor 215 not conducting, the potential at point 241 goes positive, thereby base-biasing the transistor 210 to non-conduction, which removes the low impedance shunt path around the resistor 214 and effectively re-inserts this resistor in series into the supply circuit of the step servo motor 42.

At this time, all of the elements of this circuit have spontaneously returned to the initial normal operating conditions, as previously described, and are prepared for the next record medium advance signal pulse from the one-shot oscillator 107 of FIGURE 9. The time required for these elements to return to their normal operating conditions is determined by the time required to charge the capacitor 181, which effects the triggering of the controlled rectifier 190. In the practical application, this time varied between thirty-two and forty-five milliseconds. This range provided ample time for the platen solenoid to operate and for the step servo motor to advance one step. This circuitry, therefore, provides a signal of from thirty-two to forty-five milliseconds' duration in response to each fifty-microsecond record medium advance signal pulse produced by the one-shot oscillator 107.

FIGURE 11 sets forth schematically the energizing circuitry for the step servo motor 42 and the gating circuitry which selects the proper coil of this motor next to be energized. The armatures of motors of this type may be rotated by successive steps of ninety degrees per step, as previously brought out. After any two adjacent coils of a total of four coils have been energized, the armature may be rotated through a succession of steps of ninety degrees each by energization of the next preceding coil and de-energization of the coil which is not adjacent to the latest energized coil, as will be now explained.

The four coils of the step servo motor 42 (FIGURES 2 and 3) have been identified by the reference numerals 42a, 42b, 42c, and 42d in FIGURE 11. One end of each of these coils is returned through line 250 and the terminal 251 of FIGURE 11, terminal 207, resistor 214 or transistor 210 and terminal 151 of FIGURE 10 to the positive potential terminal 93 of FIGURE 12. The opposite end of each of these coils is returned through respective controlled rectifiers 252, 253, 254, and 255, line 256 and terminal 242 to the unregulated negative potential terminal 95 of FIGURE 12.

A charging circuit for each of the capacitors 260 and 261 may be traced from the terminal 166, connected to the regulated positive potential terminal 93 of FIGURE 12, through line 262, resistor 167, resistor 263 and capacitor 260 to terminal 242 and through resistor 171, resistor 264 and capacitor 261 to terminal 242, connected to the unregulated negative potential terminal 95 of FIGURE 12.

When capacitors 260 and 261 have charged, the polarity of the potential at points 265 and 266 goes positive. This positive polarity potential is applied to the control electrodes 272 and 274 of respective controlled rectifiers 253 and 252, thereby triggering these two devices to conduction. As the control electrodes 273 and 275 of respective controlled rectifiers 255 and 254 receive no positive potential at this time, these devices are normally not conducting.

When the controlled rectifier 252 conducts, a charging circuit for the capacitor 280 is established from terminal 251, connected to the regulated positive potential terminal 93 of FIGURE 12 through terminals 207 and 151 of FIGURE 10, through line 250, step servo motor coil 42c, capacitor 280 and conducting controlled rectifier 252 to terminal 242, and, with the controlled rectifier 253 conducting, a similar charging circuit for the capacitor 281 may be traced from terminal 251, through line 250, step servo motor coil 42d and conducting controlled rectifier 253 to terminal 242, connected to the unregulated negative potential terminal 95 of FIGURE 12. These charging circuits place a positive polarity charge upon the right plates, as looking at FIGURE 11, of each of the capacitors 280 and 281.

The step servo motor coils 42a and 42b are also energized when the controlled rectifiers conduct through circuits which may be traced from terminal 251 to terminal 242 through line 250 and the parallel combination of coil 42a and series conducting controlled rectifier 252 and coil 42b and series conducting controlled rectifier 253.

A diode pair gate or AND circuit is provided for each of the controlled rectifier devices for selecting the proper step servo motor coil to be energized upon the appearance of an inverted record medium advance signal pulse upon terminal 150 of FIGURE 10. Diode pairs 168 and 282, 170 and 283, 172 and 284, and 174 and 285 each constitute a gate circuit for each of respective controlled rectifiers 253, 255, 252, and 254.

The anodes of all of these gate diodes are connected to terminal 166 through respective resistors 167, 169, 171, and 173 and line 262. In the absence of a record medium advance signal pulse, the polarity of the potential appearing at terminal 165 and line 290 is negative, as the transistor 160 (FIGURE 10) is normally conducting. This negative potential forward biases the cathodes of diodes 168, 170, 172, and 174, one from each gate pair, and these diodes are normally conducting, thereby providing a low impedance electrical circuit in shunt with each of respective series resistor pairs 263 and 258, 291 and 292, 264 and 293, and 294 and 295. With the controlled rectifiers 252 and 253 conducting and the controlled rectifiers 254 and 255 not conducting, a positive polarity potential appears at points 301 and 303, and a negative polarity potential appears at points 300 and 302. The positive potential appearing at points 301 and 303 reverse biases the cathodes of respective diodes 285, gated with diode 174, and 282, gated with diode 168, and the negative polarity potential appearing at points 300 and 302 forward biases the cathodes of respective diodes 284, gated with diode 172, and 283, gated with diode 170.

Assuming that the "Tape Feed" operation key of FIGURE 8 is depressed and maintained, a series of spaced, fifty-microsecond record medium advance signal pulses will be applied to the terminal 150 (FIGURE 10) in a manner previously described. The spaces between these pulses will, of course, be determined by the frequency of the free-running multivibrator 112 of FIGURE 9. The first signal pulse base biases the transistor 160 of FIGURE 10 to cutoff and holds this transistor off for fifty microseconds. During the period the transistor 160 is held off, the negative forward bias potential is removed from the cathodes of gate diodes 168, 170, 172, and 174 of FIGURE 11; therefore, these diodes are essentially biased off and do not conduct during this period. To this extent, the record medium advance signal pulses affect the gate circuitry of FIGURE 11.

The initial reverse bias present upon the cathodes of gate diodes 282 and 285, from respective points 303 and 301, holds these devices off as the polarity of the potential on line 290 goes positive. Therefore, both diodes of the diode gate pairs 174 and 285 and 168 and 282 are simultaneously biased off at this time, thereby opening the low impedance shunt paths around respective series resistors 295 and 294 and 263 and 258, and the polarity of the potential at respective points 304 and 265 goes positive, since terminal 166 is connected to the regulated positive potential terminal 93 of FIGURE 12.

The positive potential at point 304 is applied to the control electrode 275 of the controlled rectifier 254, thereby triggering this device to conduction. The conduction of the controlled rectifier 254 establishes a discharge path for the capacitor 280, and the positive polarity charge upon its right plate, which is applied to the cathode of the controlled rectifier 252, reverse biases this device to cutoff, which de-energizes the coil 42c and advances the step servo motor 42 one step and establishes a charging circuit for the capacitor 280, which now charges in the reverse direction, its left plate receiving a positive polarity charge. As the controlled rectifier 253 is already conducting, the positive polarity potential at point 265 is ineffective and does not change the circuitry in any manner.

As neither controlled rectifier 253 nor 255 changed states, the polarity of the potentials appearing at points 300 and 301 remain unchanged. However, with the controlled rectifier 252 now not conducting and the controlled rectifier 254 now conducting, the polarity of the potential at point 302 goes positive, and the polarity of the potential at point 303 goes negative. The positive polarity potential at point 302 is applied as a reverse bias to the cathode of the diode 283, and the negative polarity potential appearing at point 303 is applied as a forward bias to the cathode of diode 282.

With the next record medium advance signal pulse appearing on terminal 150 of FIGURE 10, both diodes of diode pairs 170 and 283 and 174 and 285 are simultaneously biased off, thereby opening the low impedance shunt paths around respective series resistors 291 and 292 and 295 and 294. The polarity of the potential at respective points 305 and 304, therefore, goes positive, and this positive potential is applied to the control electrodes 273 and 275 of respective controlled rectifiers 255 and 254. As the controlled rectifier 254 is already conducting, the positive potential at point 304 is of no consequence; however, the positive polarity potential at point 305 triggers the controlled rectifier 255 to conduction. The conducting controlled rectifier 255 establishes a discharge path for the capacitor 281, and the positive potential upon its right plate, which is applied to the cathode of the controlled rectifier 253, reverse biases this device to cutoff, which deenergizes coil 42b of the step servo motor 42, establishes a circuit which energizes coil 42d and advances the step servo motor 42 one step, and establishes a charging circuit for the capacitor 281, which now charges in the reverse direction, its left plate receiving a positive polarity charge. The positive potential now appearing at points 300 and 302, of course, reverse biases the cathodes of the gate diodes 284 and 283, respectively, which enables the gates of which these diodes are a part to select the next coil of the step servo motor to be energized upon the occurrence of the next inverted record medium advance pulse on line 290.

Through the operation of the circuitry just described, therefore, the step servo motor 42 may be stepped one position with each record medium advance signal pulse.

As was brought out earlier in the specification, the printing is effected by a thermal point head unit composed of a plurality of small resistive elements supported by a high-resistivity substrate material and arranged in a matrix of columns and rows wherein electrical current pulses passing through the resistive elements raises their temperature sufficiently to thermally mark sensitive record material in cooperative relationship therewith.

In the practical application, this matrix was composed of thirty-five resistive elements arranged in five columns and seven rows, as set forth schematically in FIGURE 17, where each resistive element is represented as a black square, with the columns numbered 1 through 5 and the rows lettered "A" through "G." In this figure, the return conductor is shown as being common to all of the elements of the matrix and is returned to point of reference potential or ground 312 through a controlled rectifier device 310 and a type PNP transistor 311. The specific electrical connections to the controlled rectifier 310 and to the transistor 311 will be set forth in detail in the description of the circuits of FIGURES 15 and 16. In the interest of clarity, each of the thirty-five individual supply conductors is labeled to indicate the resistive element to which it is connected. That is, the conductor labeled 1A is connected to resistive element 1A, and so forth for each. The terminal 313 is connected to the regulated negative potential terminal 92 of FIGURE 12, while each of the individual supply lines is connected through a respective controlled rectifier to line 314. The controlled rectifier devices serve as switches, and the specific connections thereto will be set forth in the description of the circuitry of FIGURE 13. To energize specific ones of the resistive elements, the corresponding controlled rectifier is triggered to conduction in a manner to be explained later.

FIGURE 13 schematically sets forth the print head units and the circuitry through which the desired resistive elements to be energized are selected. As the operation of the printer of this invention will be explained on the basis of one and multiple print head units, two print head units have been schematically set forth as shown within the dashed rectangles which represent head units 26 and 27. Each resistive element has been represented by the symbol for a resistor. These representatives have been identified in the rectangle which corresponds to head unit 26 by reference characters 1A, 2A, 3A, 4A, and 5A to indicate that they correspond to the similarly-labeled black rectangle representations of the resistive elements of FIGURE 17. In the interest of drawing clarity, only five of the thirty-five resistive elements and the corresponding selection circuits have been shown in FIGURE 13, as this is all that is necesasry to adequately explain the resistive element selection technique. In the actual embodiment, of course, there are six more circuits, each identical to that set forth in FIGURE 13, or a total of seven, one for each row of resistive element. When two or more print heads connected in parallel are employed, isolating diodes 315 through 324 are required, so that the selected resistive elements of only one head be energized at any one time. As only one head has been shown in FIGURE 17, these diodes have not been shown. Inserted between each isolating diode and the corresponding resistive element is a current-limiting resistor, shown in FIGURE 13 but not referenced.

Associated with each resistive element is a respective resistive-element-controlled rectifier switch, identified in FIGURE 13 by reference characters S1A, S2A, S3A, S4A, and S5A, which serve as electronic switches through which selected resistive elements may be energized. Although only five of these devices have been shown in FIGURE 13, there is one required for each resistive element of the matrix, as shown in FIGURE 17. The cathode of each of these devices is connected to bus 314 in parallel, as clearly shown in FIGURE 17, which is connected, through terminal 313, to the regulated negative potential terminal 92 of the power supply of FIGURE 12, and the anode of each is connected to the corresponding resistive element through the associated isolating diode and current-limiting resistor.

The common line of each resistive element is returned to point of reference potential 312 (FIGURE 15) through terminal 491 and transistor 311, which serves as a resistive element energizing circuit master switch. With single printing head operation, terminal 491 is connected to terminal 330 of FIGURE 13, and the energizing circuit for any resistive element may be traced from bus 314, through any conducting resistive-element-controlled rectifier switch device, the corresponding resistive element, terminal 330, terminal 491 of FIGURE 15, and transistor 311 to point of reference potential 312. With multiple head operation, terminals 330 and 331 of FIGURE 13 are connected to respective terminals 332 and 333 of the print head select circuitry schematically set forth in FIGURE 16. The function of this circuitry is to select the print head to be energized, as the resistive elements of only one head unit may be energized at any one time. Terminals 332 and 333 are connected, through respective head select controlled rectifiers 310 and 335, to terminal 334, which is connected to terminal 491 of FIGURE 15. With this arrangement, therefore, the energizing circuit for any resistive element of print head 26 is returned to point of reference potential or ground 312 (FIGURE 15), from terminal 330 of FIGURE 13, through terminal 332 of FIGURE 16, head select controlled rectifier 310 and terminal 334 to terminal 491 of FIGURE 15 and the energizing circuit for any resistive element of print head 27 is returned to point of reference potential 312 from terminal 331 of FIGURE 13, through terminal 333 of FIGURE 16, head select controlled rectifier 335 and terminal 334 to terminal 491 of FIGURE 15.

To supply the positive polarity potential pulse required to trigger the proper resistive-element-controlled rectifier switch, the potential pulses induced in the sense winding of a corresponding substantially square hysteresis loop magnetic core, upon the reversal of the state of magnetic remanence of that core, are employed. Therefore, a matrix of magnetic cores of this type having a core for each corresponding resistive-element-controlled rectifier switch and resistive element is provided, as set forth in FIGURES 18, 19, 20, and 21, wherein each core has been identified with the resistive element and switch to which it corresponds. For example, core C1A corresponds to resistive element 1A and associated controlled rectifier switch S1A, and core C3F corresponds to resistive element 3F and the associated controlled rectifier switch, not shown, and so forth. As there are thirty-five resistive elements per head in this embodiment, this magnetic core matrix contains thirty-five cores. These cores may be arranged as shown in the figures or in any other suitable configuration.

All of the cores of the matrix are threaded by a read-out winding 340, as shown in FIGURE 18, while each core is threaded by an individual sense winding, as shown in FIGURE 21, wherein only the sense windings which are shown in FIGURE 13 are identified by the reference numerals 341, 342, 343, 344, and 345. The read-in or set windings for the core matrix will be explained later. Since only five of the thirty-five controlled rectifier switches and resistive elements for each print head are schematically shown in FIGURE 13, only five of the magnetic cores and sense windings are shown therein. Because FIGURE 13 is a schematic circuit diagram, each core shown has been represented by a short diagonal line, the corresponding individual sense windings 341, 342, 343, 344, and 345 have been represented as vertical lines passing through the diagonal core representation lines, and read-out line 340 has been represented as a horizontal line passing through the diagonal core representation lines. The external connections to and the functions of these elements will be later explained in detail in connection with the explanation of FIGURE 15.

For each character to be printed, there is provided a read-in or set winding which threads, in a sense opposite that of the read-out winding, only those cores which correspond to the resistive elements to be energized to print that character. As the printer of this embodiment is designed to print all of the letters of the alphabet and numerical digits, a total of thirty-six set windings is required. The read-in or set windings for the letter "A" and the numerical digit "8" are schematically set forth in FIGURES 19 and 20, respectively. To print the letter "A," resistive elements 1C through 1G, 2B and 2E, 3A, 3E, 4B and 4E, and 5C through 5G must be energized to outline this character as a series of dots similar to those illustrated in FIGURE 7. Therefore, the "A" read-in or set winding threads only the corresponding cores of the core matrix, C1C through C1G, C2B, and C2E, C3A and C3E, C4B and C4E, and C5C through C5G. Similarly for the numerical digit "8," the resistive elements 1B, 1C, 1E, and 1F; 2A, 2D, and 2G; 3A, 3D, and 3G; 4A, 4D, and 4G; and 5B, 5C, 5E, and 5F must be energized. Therefore, the "8" set winding threads only the corresponding cores of the matrix, as shown. The cores of the matrix threaded by the remainder of the character is set forth in the table of FIGURE 22.

Terminals 350 and 351 of the letter "A" read-in winding illustrated in FIGURE 19 are connected to respective terminals 22 and 23 of the circuit between negative potential bus 103 and the "letters" bus 104 of FIGURE 8, which is closed by the operation of the electrical switch 80b upon the depression of the keyboard key corresponding to the letter "A." Terminals 352 and 353 of the numerical digit "8" read-in winding illustrated in FIGURE 20 are connected to respective terminals 32 and 33 of the circuit between negative potential bus 103 and the "numbers" bus 105 of FIGURE 8, which is closed by the operation of the electrical switch 80c upon the depression of the keyboard key corresponding to the letter "I" and the digit "8." The set windings for the remainder of the characters are similarly connected in the respective circuits which are completed between the negative potential bus 103 and either the "letter" bus 104 or the "numbers" bus 105 by the depression of the keyboard key to which each corresponds. The diodes included in these circuits which are completed by the dual character keys are isolation diodes which insure that either the "letters" bus 104 or the "numbers" bus 105 is energized upon the depression of one of these keys, but not both.

FIGURE 14 schematically sets forth the delay circuitry which initiates the signal to effect printing upon the depression of a keyboard key and selects the character group, either alphabetical or numerical, which will be printed upon the depression of one of the dual character keys.

The circuitry included within dashed rectangle 360 comprises a trigger circuit of the type which may be triggered into an alternate state and maintained in the alternate state until the triggering signal is removed. The terminal 361 is connected to the regulated negative potential terminal 92 of the power source of FIGURE 12, which supplies the forward collector bias for the type PNP transistors 362 and 363. The emitter electrode of each of these transistors is connected to point of reference potential 364, which places these elements at substantially ground potential. The bias potential for the base 365 of the transistor 362 is taken from a point along a potential divider network comprising resistors 366, 367, 368, and 369, connected in series between terminal 361 and terminal 370, which is connected to the positive potential terminal 93 of FIGURE 12. The bias potential for the base 375 of the transistor 363 is taken from a point along a potential divider network comprising resistors 376, 377, 378, and 369 connected in series between terminals 361 and 370. Because of capacitor 379 in shunt with resistor 377, the transistor 363 will always conduct before the transistor 362 upon the application of supply potential and will remain in the conducting state until a negative polarity pulse of sufficient magnitude to produce conduction is applied to the base 365 of the transistor 362 from the emitter electrode 400 of the transistor 402 in a manner to be explained later.

Upon the depression of a dual character keyboard key, to effect the printing of a corresponding numerical digit or alphabetical character, as selected by the prior depression of the "FIG" operation key or the "LTR" operation key, a conventional one-shot oscillator 381 and a conventional one-shot oscillator 382 are provided. These devices operate in a manner similar to that previously explained in regard to the oscillator 107 of FIGURE 9. That is, respective transistors 383 and 384 of each of these devices may be triggered into the conducting state for a predetermined duration of time, at the conclusion of which they return to the original state until retriggered. Without intention or inference of a limitation thereto, the duration of time in the practical embodiment was fifty microseconds. The collector electrode 385 of the transistor 383 and the collector electrode of the transistor 384 are connected through respective terminals 390 and 391 of FIGURE 14 and 100 and 101 of FIGURE 8 to the "numbers" bus 105 and the "letters" bus 104 (FIGURE 8), respectively. As the emitter electrodes of the transistors 383 and 384 are connected to point of reference potential or ground 392, the conduction of the transistor 383 completes an energizing circuit for the numerical digit read-in or set windings of the core matrix, and the conduction of the transistor 384 completes an energizing circuit for the alphabetical letters read-in or set windings of the core matrix, the specific character set winding energized being determined by the key which is depressed.

To direct the signal produced by the trigger 360 to the desired one-shot oscillator 381 or 382, a character group select switching circuit comprising a conventional bistable multivibrator 380 including transistors 393 and 394 is provided. The respective bases of these transistors are biased in such a manner that the transistor 394 always conducts first upon the application of supply potential.

The contacts of the switches 80, which are operated by the key lever arms, are delicate and, therefore, are incapable of switching the current through the core matrix read-in or set windings any appreciable number of times. To increase contact life, the solar cell 404 was incorporated to insure that the contacts of the switches 80 close and open under substantially no-load conditions. The terminals 361 and 401 are connected to the regulated negative potential terminal 92 and the regulated positive potential terminal 93, respectively, of FIGURE 12. Connected in series between terminal 361 and point of reference potential 364 is the series combination of a resistor 403, the solar cell 404, and a resistor 408. The solar cell 404 is a device which is conductive in the presence of light and non-conductive in the absence of light. A solar cell light source 406 and a pilot light 407 are connected between the terminals 361 and 401 and, therefore, are normally illuminated. The solar cell 404 and the light source 406 are mounted on opposite sides of the printer unit and are located in such a manner that the key lever arm operated upon the depression of any key or the space bar interrupts the light beam. The solar cell 404 may be mounted on the right side of the printer beneath the center row of keyboard keys, as indicated by the dotted circle in FIGURE 1, and the light source may be mounted on the left side of the unit, as shown in FIGURE 3.

As the output of the solar cell is insufficient to operate the circuit of the device 360, an emitter foller circuit is used as a current amplifier between the solar cell and the device 360. The base electrode potential for the type PNP transistor 402 of the emitter follower circuit is taken from the junction 410 of the resistor 403 and the solar cell 404. The collector of the transistor 402 is connected to a negative potential through resistor 412 and terminal 361. The emitter of the transistor 402 is connected to the base of the transistor 362 and, through resistors 362 and 364 to the positive potential at terminal 370. Thus the transistor 402 is always biased for conduction, and its emitter therefore essentially maintains the same potential as its base.

Since the light source 406 is normally illuminated, the solar cell 404 is normally conducting; therefore, the potential at point 410 is normally of a positive polarity relative to the point 405.

As the emitter of the transistor 402 maintains the potential of its base, the emitter of the transistor 402 and the base of the transistor 362 are positive relative to point 405. As this does not satisfy the base-emitter bias requirements for conduction through a type PNP transistor, the transistor 362 is normally not conducting.

Upon the interruption of the light beam from the light source 406 by any key lever arm, the solar cell 404 no longer conducts, and the polarity of the potential at point 410 goes negative. Since the emitter potential follows the base potential in the transistor 402, the emitter also goes more negative until the transistor 362 begins to conduct through its base circuit.

Upon the depression of any one of the keyboard keys or the space bar of FIGURE 8, the contacts of the corresponding switch 80 are arranged to close before the associated key lever arm has interrupted the light beam between the source 406 and the solar cell 404. Assuming that the key corresponding to the letter "A" is depressed, the contacts of the switch 80b close after a very short key travel and set up a circuit from the negative potential bus 103, through the core matrix "A" set winding connected between terminals 22 and 23, to the "letters" bus 104. However, the set winding energizing circuit is not complete, as the transistor 384 of the one-shot oscillator 382 of FIGURE 14 is not yet conducting to complete this circuit to point of reference potential 392. The contacts of the switch 80b, therefore, are closed under substantially "no-load" conditions.

When the key lever arm corresponding to the "A" key interrupts the light beam illuminating the solar cell 404, this device is turned off, and the polarity of the potential at point 410 (FIGURE 14) goes negative. This negative polarity potential is applied to the base electrode 365 of the transistor 362, through the circuit of the transistor 402, as described above.

When the negative potential applied to the base 365 reaches a level of sufficient magnitude to bias the type PNP transistor 362 to conduction, the device 360 is triggered into its alternate state, and the transistor 363 is cut off. As the transistor 363 is cut off, the potential at point 412 goes from substantially ground potential to a negative value. This negative going pulse is differentiated by the capacitor 420-resistor 421 combination and the capacitor 422-resistor 423 combination and appears as a negative potential spike in each of lines 424 and 425.

As previously set forth, the transistor 394 of the bistable multivibrator 380 is initially conducting, and the transistor 393 is not conducting. Therefore, the potential at point 430 is of a positive polarity, which forward biases the diode 431. As the diode 431 is forward biased, the negative potential spike appearing on line 424 is shunted to point of reference potential 432 through the conducting transistor 394 and is of no more consequence at this time. The potential at point 433, however, is of a negative polarity, as the transistor 393 is not conducting, which reverse biases the diode 434. The negative potential spike appearing on line 425, therefore, is not shunted to point of reference potential 432 but is translated through diode 435 to the base electrode 436 of the transistor 384 of the one-shot oscillator 382.

Since the "A" letter keyboard key is still depressed, the collector electrode 386 of the transistor 384 is negatively biased by the negative potential appearing on the "letters" bus 104 of FIGURE 8, which is connected, through terminal 101, to terminal 391 of FIGURE 14. The negative polarity potential spike applied to the base electrode 436 of the transistor 384 satisfies the base-emitter bias requirements for a type PNP transistor, and the transistor 384 is triggered to conduction, in which state it remains for a predetermined duration of time, in this instance fifty microseconds. The conducting transistor 384 completes an energizing circuit for the core matrix read-in or set windings corresponding to the letters of the alphabet to point of reference potential 392 which may be traced from the "letters" bus 104 of FIGURE 8, through terminal 101, terminal 391 of FIGURE 14 and transistor 384 to point of reference potential 392. Therefore, the energizing circuit for the read-in or set winding corresponding to the letter "A," which has been set up as previously described, is completed, by the delay circuitry of FIGURE 14, to point of reference potential 392, and the state of magnetic remanence of all cores of the matrix which are threaded by the "A" read-in winding is reversed to the "set" state of magnetic remanence.

The release of the keyboard key corresponding to the letter "A" re-establishes the light beam between the light source 406 and the solar cell 404 (FIGURE 14), and the solar cell 404 is again illuminated, and the trigger circuit 360 returns to the initial normal state, with the transistor 363 conducting and the transistor 362 not conducting. The circuitry is now in condition to receive another input.

Assuming that the dual character key corresponding to the letter "I" and the numeral "8" is now depressed, the contacts of the corresponding switch 80c close and complete a first circuit from negative potential bus 103, through the core matrix "I" set winding connected between terminals 62 and 63, to the "letters" bus 104 and a second circuit from negative potential bus 103, through the core matrix "8" set winding connected between terminals 32 and 33, to the "numbers" bus 105. Since the state of the character group selecting multivibrator 380 has not changed, the negative potential spike appearing on line 424 in response to the operation of the trigger 360 is shunted to point of reference potential 432 through the conducting transistor 394 of the multivibrator 380, and the negative potential spike appearing on line 425 is translated by diode 435 to trigger the transistor 384 to conduction, as previously described. The energizing circuit for the letter "I" read-in winding, therefore, is completed to point of reference potential 392 through the conducting transistor 384. The "numbers" bus 105 of FIGURE 8 is connected through terminals 100 of FIGURE 8 and 390 of FIGURE 14 to the collector electrode 385 of the transistor 383. Since the transistor 383 is not conducting, the energizing circuit for the numeral "8" read-in winding is not completed to point of reference potential 392. Therefore, only the letter "I" read-in winding is energized, and only those cores of the core matrix threaded by this winding are placed in the "set" state of magnetic remanence.

The depression of the "FIG" operation key (FIGURE 8) places the negative polarity potential present on the bus 103 upon the base electrode of the transistor 393 of the character group select switching multivibrator 380 of FIGURE 14 through a circuit which may be traced from negative potential bus 103 (FIGURE 8) through the closed contacts of the associated switch 80, terminal 97, terminal 440 of FIGURE 14, and resistor 441. This negative polarity potential upon the base electrode of the type PNP transistor 393 satisfies the base-emitter bias requirements for transistors of this type; therefore the transistor 393 is triggered to conduction, and the transistor 394 is extinguished. The multivibrator 380 is now in its alternate state, with the transistor 393 conducting and the transistor 394 not conducting, and the potential at points 433 and 430 goes positive and negative, respectively.

The key lever arm associated with the "FIG" operation key also interrupts the light beam between the aforementioned light source and solar cell, which results in the appearance of a negative potential spike on lines 424 and 425 in response to the operation of the trigger 360, as previously described. However, neither the collector electrode 385 of the transistor 383 nor the collector electrode 386 of the transistor 384 has bias potential applied to it at this time; therefore, these negative potential spikes are ineffective and do not trigger either one-shot oscillator 381 or 382.

Considering the negative potential spikes which appear on lines 424 and 425, in a manner previously described, with the state of the character group select switching multivibrator 380 reversed, the spike appearing on line 425 is shunted to point of reference potential 432, through the conducting diode 434 and the transistor 393, while the spike appearing upon line 424 is directed through diode 451 to the base electrode 452 of the transistor 383 of the one-shot oscillator 381. The negative potential upon the base electrode 452 satisfies the base-emitter bias requirements for a type PNP transistor; therefore, the transistor 383 conducts for the predetermined period, as previously set forth. The conducting transistor 383 completes an energizing circuit for the core matrix read-in or set windings corresponding to the numerical digits to point of reference potential 392 which may be traced from the "numbers" bus 105 of FIGURE 8, through terminal 100, terminal 390 of FIGURE 14, and transistor 383 to point of reference potential 392. Therefore, the core matrix read-in winding for the numerical digit corresponding to the dual character key depressed is energized, which reverses the state of magnetic remanence of all cores of the core matrix which are threaded by this winding. Since the transistor 384 of the one-shot oscillator 382 is not triggered with the multivibrator 380 in the present state, the energizing circuit for the "letters" bus 104 of FIGURE 8 is not completed to point of reference potential 392 of FIGURE 14; therefore, the depression of any letters key is ineffective. To indicate the state of the multivibrator 380, a "figures" indicating light 453 is included in the collector circuit of the transistor 393. With the transistor 393 conducting, the light 453 is illuminated, which indicates to the operator that the printer is in a condition to print the numerical digits only.

To condition the printer to print the letters of the alphabet after the "FIG" operation key has been depressed, it is necessary that the "LTR" operation key be depressed. As this operation key is depressed, the associated switch 80 is closed, placing the negative potential present on bus 103 upon the base electrode of the transistor 394 of the multivibrator 380 through a circuit which may be traced from negative potential bus 103 (FIGURE 8) through the closed contacts of associated switch 80, terminal 99, terminal 442 of FIGURE 14, and resistor 443. This negative polarity potential base biases the transistor 394 of the multivibrator 380 to conduction, thereby reversing this device to the original state. That is, the transistor 393 is not conducting, and the transistor 394 is conducting, and the potentials at points 433 and 430 go negative and positive, respectively. With these conditions, the depression of the next key results in the triggering of the transistor 384 of the one-shot oscillator 382.

From this description, it is apparent that the state of the character group select switching multivibrator 380 determines whether the "letters" bus 104 or the "numbers" bus 105 of FIGURE 8 is returned to point of reference potential 392 upon the depression of one of the character keys by directing the negative potential spike appearing on line 424 to the one-shot oscillator 381 or the potential spike appearing on line 425 to the one-shot oscillator 382. With the one-shot oscillator 381 conducting, the "numbers" but 105 of FIGURE 8 is returned to point of reference potential 392, and an energizing circuit for the core read-in winding of the numerical digit corresponding to the key depressed is established, whereas the conducting one-shot oscillator 382 returns the "letters" bus 104 of FIGURE 8 to point of reference potential 392, and an energizing circuit for the core read-in winding of the alphabetical letter corresponding to the key depressed is established. So that the printer is normally in condition to print the letters of the alphabet, the initial state of the multivibrator 380 was selected to be such that the negative potential triggering pulses appearing on line 425 are directed to the base 436 of the transistor 384 of the one-shot oscillator 382. Therefore, to effect the printing of letters of the alphabet, the "LTR" operation key need be depressed only after the "FIG" operation key has been depressed.

It may be noted that the depression of the space bar places the negative potential appearing on bus 103 of FIGURE 8 upon both the "letters" bus 104 and the "number" bus 105 through the associated switches 80. Therefore, the depression of the space bar conditions both transistors 383 and 384 of respective one-shot oscillators 381 and 382 for conduction, and either oscillator 381 or oscillator 382 is triggered upon the depression of this key. Since there are no core windings in the "space bar" circuit, the core matrix is unaffected. However, each time either transistor 383 or transistor 384 conducts, a print signal pulse of a duration equal to the conducting period of either appears on the output terminal 460. This print signal pulse goes from substantially ground potential, with both transistors 383 and 384 not conducting, to a negative polarity potential with either one of these transistors conducting, and is utilized by the circuitry next to be described to effect printing and record medium advance. Because record medium advance is also determined by this pulse, the depression of the "space bar" is arranged to always trigger one of the transistors 383 or 384.

The circuitry schematically set forth in FIGURE 15 is essentially switching circuitry for effecting the read-out of the core matrix and the energization of the head resistive elements. Because the pulse appearing upon terminal 460 of FIGURE 14 during the period that either transistor 383 or 384 is conducting is of a short duration, approximately fifty microseconds in the practical embodiment, a conventional mono-stable multivibrator device 470 is employed to extend this pulse to a practical duration of time, approximately fifteen milliseconds, in response thereto. Devices of this type are well known in the art and are characterized by the ability to be triggered from a normal state into an alternate state, in which condition the device remains for a predetermined period of time, as determined by the capacitor 471 and the resistors 472 and 479, at the conclusion of which the device spontaneously returns to the normal state. In this embodiment, the transistor 473 is normally conducting, and the transistor 474 is normally not conducting. The transistor 311, connected in series with the transistor 474, does not conduct, while the transistor 474 is not conducting.

To supply bias and operating potentials to this circuitry, the terminals 336, 475, and 476 are connected to the regulated negative potential terminal 92, the regulated positive potential terminal 93, and the unregulated negative potential terminal 95 of the power supply set forth in FIGURE 12.

The circuitry set forth in FIGURE 16 is the head select switching circuitry and is employed only with multiple head operation to select the print head unit next to be energized. As the multiple head operation of this embodiment will be described on the basis of two print head units, it is only necessary that either one be next energized. Therefore, a conventional bistable multivibrator 480 is sufficient for this embodiment. Devices of this type are well known in the art and are characterized by the ability to be triggered from one stable state to an alternate stable state, in which condition the device remains until re-triggered into the initial stable state. Upon the application of supply potentials to a device of this type, either transistor 481 or transistor 482 will conduct, and the other will, therefore, not conduct. For purposes of this description, it will be assumed that transistor 482 is initially conducting and transistor 481 is not conducting.

To supply bias and operating potentials to this circuitry, the terminals 483, 484, and 485 are connected to the regulated negative potential terminal 92, the regulated positive potential terminal 93, and the unregulated negative potential terminal 95, respectively, of the power supply set forth in FIGURE 12.

Upon the application of supply potentials to the circuitry of FIGURE 15, the transistor 473 conducts, and the transistors 474 and 311 do not conduct. The potential at point 490, therefore, is of a negative polarity, from terminal 336, and is applied, through terminal 491 and terminal 334 (FIGURE 16) as a reverse bias to the anodes of the head selection controlled rectifiers 310 and 335. Also, a charging circuit for the capacitor 492 is established from terminal 336, through resistor 493, capacitor 492, and resistor 494 to point of reference potential 495.

As either transistor 383 or 384 of FIGURE 14 is triggered to conduction by any of the operations previously described, a pulse, which goes from substantially ground potential to a negative polarity potential during the period either of these transistors is conducting and then returns to substantially ground potential, appears on terminal 460 and is applied to terminal 496 of FIGURE 15. This negative going print signal pulse is differentiated by the capacitor 497 and the resistor 498, and its trailing positive going spike is applied through the diode 499 to the base electrode 500 of the transistor 473.

This positive potential spike upon the base 500 of the transistor 473 destroys the base-emitter bias requirements for conduction through a type PNP transistor; therefore, the transistor 473 is base-biased to non-conduction, and the mono-stable multivibrator 470 is triggered to its alternate state, with the transistor 473 not conducting and the transistor 474 conducting. With the transistor 474 conducting, the potential at point 501 goes from a negative value to substantially ground during the period that this transistor is conducting.

The positive going pulse appearing at point 501 is directed through terminal 502 to the respective base electrodes of the transistors 481 and 482 of the bistable multivibrator 480 (FIGURE 16) through terminal 503. This positive polarity pulse applied to the base electrode 504 of the transistor 482 destroys the base-emitter bias requirements for a type PNP transistor, and the transistor 482 is base biased to non-conduction. As the transistor 482 ceases conduction, the bistable multivibrator 480 is triggered to its alternate state, with the transistor 481 conducting and the transistor 482 not conducting.

With the transistor 481 conducting, the potential at point 505 goes from a negative value to substantially ground. This positive going pulse is translated through the diode 510 and is applied to the control electrode 511 of the head selection controlled rectifier 310, thereby triggering this device to conduction, in which state it remains until it is extinguished.

During the period that the transistor 474 of the mono-stable multivibrator 470 (FIGURE 15) is conducting, the transistor 311 also is conducting. As this transistor serves as an electronic switch which completes the energizing circuit for the print head resistive elements common leads to point of reference potential 312, it has an appreciably higher current rating than the smaller transistors 473 and 474 of the mono-stable multivibrator 470. The conducting transistor 311 also establishes a charging circuit for the capacitor 512 from terminal 336, through capacitor 512, resistor 513, and conducting transistor 311 to point of reference potential 312. The capacitor 512 charges until the potential thereacross reaches a value of sufficient magnitude to break down the Zener diode 514, at which time this diode conducts. With the Zener diode 514 conducting, the polarity of the potential at point 515 goes positive, and this potential is applied to the control electrode 521 of the controlled rectifier 520, thereby triggering this device to conduction. The conducting controlled rectifier 520 establishes a discharge circuit for the capacitor 492 through the core matrix read-out line 340 (FIGURES 18 and 13) which may be traced from the left plate of the capacitor 492, as looking at FIGURE 15, conducting controlled rectifier 520, terminal 336, terminal 92 of FIGURE 12, terminal 313 of FIGURE 13, bus 314, read-out winding 340, terminal 522, terminal 523 of FIGURE 15, and diode 524 to the right plate of capacitor 492. As the read-out winding 340 threads all of the cores of the core matrix, as shown in FIGURE 18, in a sense opposite that of the character read-in or set windings previously described, the discharge of the capacitor 492 therethrough returns to the initial state of magnetic remanence all cores of the core matrix which had their state of magnetic remanence reversed by the energized read-in windings. This not only assures that all of the cores of the core matrix are in the initial, or reset, state of magnetic remanence, thereby conditioning the core matrix to receive another character through the energization of another read-in winding in a manner previously described, but a signal pulse is induced in the sense winding of each core which is thereby returned to the initial state of magnetic remanence. As the energized read-in winding for the character corresponding to the depressed keyboard character key set or reversed only those cores corresponding to the resistive elements of the print head which must be energized to print the desired character, only those cores are returned to the initial or reset state of magnetic remanence by the capacitor 492 discharging through the read-out winding 340, and a signal pulse appears only in the sense winding peculiar to each of these cores. It may be pointed out that the Zener diode 514 and the capacitor 512 are inserted in the circuit for the purpose of delaying the discharge of the capacitor 492 until the proper head select controlled rectifier 310 or 335 (FIGURE 16) has been conditioned for conduction by the bistable multivibrator 480, as previously described.

Each sense winding is threaded through the core to which it is peculiar in such a manner that the induced signal pulse is of a positive polarity, and is of a sufficient number of turns to produce an induced signal of sufficient magnitude to trigger the associated resistive element controlled rectifier switch. For example, should core C4A (FIGURE 13) be returned to its initial or reset state of magnetic remanence by the discharging capacitor 492 through the read-out winding 340, the potential of the signal pulse induced in the sense winding 344 must be of a positive polarity and of sufficient magnitude to trigger the associated resistive element controlled rectifier switch S4A, to the control electrode of which it is connected through diode 525.

As has been brought out previously, the conducting transistor 311 serves as an electronic switch which completes a circuit from the head resistive element common lead to point of reference potential 312. This circuit may be traced from the common lead of heads 26 and 27 (FIGURE 13) through respective terminals 330 and 331, respective terminals 332 and 333 of FIGURE 16, through the conducting head select controlled rectifier device 310 or 335, terminal 334, terminal 491 (FIGURE 15), and transistor 311 to point of reference potential 312. As any of the resistive element controlled rectifier switch devices are triggered to conduction by the positive potential pulse produced by a magnetic core of the matrix being returned to its initial or reset state of magnetic remanence, the associated resistive elements are connected in parallel between the regulated negative potential terminal 92 of the power source of FIGURE 12 through terminal 313 of FIGURE 13, connected thereto, and the common lead of the resistive elements of each head. Therefore, the resistive elements corresponding to the triggered resistive element controlled rectifier switches are energized through the circuit just described. As the head select controlled rectifier 310 (FIGURE 16) is conducting and the head select controlled rectifier 335 is not conducting, the common lead of the resistive elements of the head 26 only is returned to point of reference potential 312 (FIGURE 15), and the resistive elements of the head 27 are unaffected, in that their common lead is not returned to point of reference potential 312.

At the conclusion of the predetermined time interval designed into the mono-stable multivibrator 470 (FIGURE 15), this device returns to its normal state, with the transistor 473 conducting and the transistor 474 not conducting. With the transistor 474 not conducting, the transistor 311 also is not conducting, a condition which interrupts the resistive element energizing circuit by removing point of reference potential or ground therefrom, and the polarity of the potential at point 490 goes negative. This negative polarity potential equalizes the bias potential across the conducting head select and resistive element controlled rectifiers, thereby extinguishing these devices. At this time, this circuitry has returned to the initial state and is prepared to receive the next print signal pulse from terminal 460 of FIGURE 14.

The depression of the next character key initiates the operation of the circuitry previously described in connection with FIGURES 14 and 13, which results in the energization of the core matrix read-in winding for the character corresponding to the depressed key, thereby reversing the state of magnetic remanence of the cores threaded thereby, and the appearance of the print signal pulse on terminal 460 of FIGURE 14. This print signal pulse is applied to the base 500 of transistor 473 (FIGURE 15), triggering the mono-stable multivibrator 470 to its alternate state, with the transistor 473 not conducting and the transistor 474 conducting, as previously described. The positive going pulse appearing at point 501, as the transistor 474 conducts, is again directed to the respective bases of the transistors 481 and 482 of the head select bistable multivibrator 480 of FIGURE 16, thereby reversing its state, with the transistor 481 now not conducting and the transistor 482 conducting. The positive going pulse appearing at point 531 as the transistor 482 conducts is translated through the diode 532 and is applied to the control electrode 533 of the head selected controlled rectifier 335, thereby triggering this device to conduction. With the head select controlled rectifier 335 conducting, the circuit from the common lead for the resistive elements of head 27, to point of reference potential 312 of FIGURE 15, is completed through conducting transistor 311. Therefore, the resistive elements of the head 27 are now conditioned to be energized through the energizing circuit previously described as the resistive element controlled rectifier switches corresponding to the resistive elements which are to be energized to print the character corresponding to the character key depressed are triggered to conduction in the manner previously set forth.

From this description, it is apparent that the head select bistable multivibrator 480 is triggered each time a character key is depressed, thereby alternately conditioning the head units 26 and 27 for energization. Should more than two head units be used, this selection circuitry may be expanded to condition each successive head unit for energization in response to the depression of each character key.

Referring to FIGURE 8, it may be noted that the space bar switch 80 will, when closed upon the depression of the space bar, place the negative potential of bus 103 upon both the "letters" bus 104 and the "numbers" bus 105, but no cores of the core plane are energized by this circuit. The resulting triggering of either transistor 383 or 384 (FIGURE 14), depending upon whether the printer is conditioned to print alphabetical letters or numerical digits, produces the print signal pulse upon terminal 460. The circuitry of FIGURES 15 and 16 responds to this signal, and the head select bistable multivibrator 480 of FIGURE 16 will be triggered, thereby conditioning the other head for energization. However, since no cores of the core plane have been set by the depression of the space bar, none will be reset by the discharge of the capacitor 492 (FIGURE 15) through the read-out winding 340 (FIGURE 13). Therefore, no resistive element controlled rectifier switches will be triggered to conduction; hence, the conditioned print head will not be energized, and the record material will not be marked, thereby leaving a space. The next print signal pulse will, of course, reverse the state of the head select multivibrator 480 (FIGURE 16), and the other print head is thereby conditioned for energization and will print the character which has been "set into" the core matrix. It may be pointed out that the depression of either the "FIG" operation key or the "LTR" operation key initiates the operation of the circuitry of FIGURE 14. However, since no negative polarity supply potential is placed upon the collector electrodes of the transistors 383 and 384 when either of these two keys is depressed, these transistors do not conduct; hence, there is no print signal pulse output on terminal 460, and the circuitry of FIGURES 15 and 16 is unaffected.

In the description of the circuitry of FIGURES 15 and 16, it was brought out that the head select controlled rectifiers 310 and 335 (FIGURE 16) are alternately triggered to conduction with successive print signal pulses applied to the base of the transistor 473 of the mono-stable multivibrator 470 of FIGURE 15. Therefore, the head select controlled rectifier 335 is triggered to conduction with every other print signal pulse. As the terminal 483 is connected to the regulated negative potential terminal 92 of FIGURE 12, the potential at point 534 normally is of a negative polarity. However, upon the conduction of the head select controlled rectifier 335, the potential of point 534 is substantially ground and remains at ground potential for the period of time that the mono-stable multivibrator 470 (FIGURE 15) is in the alternate state, at the conclusion of which the potential returns to a negative polarity as the head select controlled rectifier 335 is thereby extinguished. Therefore, with every other print signal pulse, there is a positive going potential pulse of a duration equal to the period of mono-stable multivibrator 470 present upon point 534 whether print head 27 is energized or not.

This pulse is taken from terminal 535, which is connected to terminal 536 of FIGURE 9, previously described, and is differentiated by the capacitor 540 and the resistor 541. The negative going polarity spike of this differentiated pulse is applied through diode 542 to the base 109 of the type PNP transistor 108 of the one-shot oscillator 107. This negative polarity potential satisfies the base-emitter bias requirements for conduction through a type PNP transistor; therefore the transistor 108 conducts. As the transistor 108 is an element of the one-shot oscillator 107, it conducts for a predetermined period of time, at the conclusion of which it spontaneously cuts off, as previously described, and produces a negative polarity record medium advance pulse upon point 143. This pulse is taken from terminal 144 and initiates the operation of the circuitry which energizes the step servo motor 42 and advances the record medium. This circuitry and the operation of the step servo motor has been previously described in connection with the description of FIGURES 9, 10, and 11.

As the positive going potential pulse appearing at point 534 (FIGURE 16) is present only during the time that the head select controlled rectifier 335 is conducting, and this device conducts with every other print signal pulse applied to terminal 496 of FIGURE 15, the record medium is advanced with every other print signal pulse. During the printing operation, therefore, the head select controlled rectifier 310 is triggered to conduction, which conditions the print head 26 for energization to print a character. With the next print signal pulse, the controlled rectifier 335 is triggered to conduction, which conditions the print head 27 for energization to print the next character and initiates the operation of the record medium advance circuitry, as previously described. The diameter of the capstan 41 of the step servo motor 42 (FIGURE 2) is such that, with each step of the step servo motor 42, the record medium tape is advanced two print spaces by the transport mechanism previously described. Therefore, after every two print signal pulses, the record medium is advanced two spaces, and an unmarked area thereof, upon which the next two characters may be printed, is positioned in cooperation relationship with print heads 26 and 27.

As the print signal pulses are also produced upon the depression of the space bar, the head select controlled rectifiers are alternately triggered to conduction whether either print head 26 or 27 is energized or not; consequently, the spaces between words are treated as print operations by this head select and record medium advance circuitry. Therefore, should the space bar be depressed between words. the print head which printed the last character of a word also prints the first character of the next word. In this manner, then, this circuitry provides for spaces between words.

If more than two print heads are used, of course, the record medium must be advanced by a number of spaces equal to the number of heads employed, with the advance taking place upon the conditioning of the last print head for energization.

With single head operation, the head select circuitry of FIGURE 16 is not required. To provide for single head operation, the terminal 491 of FIGURE 15 and the terminal 536 of FIGURE 9 are connected to the terminal 330 of FIGURE 13. With these connections, the common lead for the resistive elements of the head 26 is returned to point of reference potential 312 through the terminal 491 and the conducting transistor 311 of FIGURE 15. The potential at point 490 (FIGURE 15) is normally at a negative polarity, with the transistor 311 not conducting, as the terminal 336 is connected to the regulated negative potential terminal 92 of the power supply of FIGURE 12. As the transistor 312 conducts during the period when the mono-stable multivibrator 470 is in the alternate state, the potential at this point is substantially ground. This positive going pulse is differentiated by the capacitor 540 and the resistor 541 of FIGURE 9, and its negative going polarity spike triggers the transistor 108 of the one-shot oscillator 107 to conduction, as previously described. Therefore, the record medium advance circuitry which energizes the step servo motor 42 is initiated with every print signal pulse. The diameter of the capstan of the step servo motor is, of course, arranged to be such that the record medium is advanced only one print space with each step thereof.

While a preferred embodiment of the present invention has been shown and described, it will be obvious to those skilled in the art that various modifications and substitutions may be made without departing from the spirit of the invention, which is to be limited only within the scope of the appended claims.

What is claimed is:

1. A thermal printer comprising a print head capable of marking a thermally-sensitive record material having a plurality of resistive elements arranged in the form of a matrix and a respective electrical circuit means for each of said resistive elements whereby the character to be printed may be outlined as a series of dots by energizing selected ones of said electrical circuit means with a short duration electrical pulse which produces in the corresponding resistive elements a temperature rise of sufficient magnitude to produce marks in the form of dots on thermally sensitive record material in cooperative relationship therewith, a source of direct current potential, a transport mechanism for advancing said record material by and in cooperative relationship with said print head, a plurality of keys each corresponding to a character to be printed, a magnetic core of the type having substantially square hysteresis loop characteristics corresponding to each of said plurality of resistive elements on said print head, a set winding for each character to be printed and each threading all of said cores which correspond to the said resistive elements which must be energized to form that character, a sense winding threading each of said cores, a read-out winding threading all of said cores in a sense opposite that of said set windings, an electrical switch means associated with and operated by each of said keys for establishing a first electrical circuit from said source of direct current potential through the said set winding for the character to which the associated key corresponds for setting the threaded cores in a selected state of magnetic remanence, a read-out switching circuit means for completing a second electrical circuit through said read-out winding for reversing the state of magnetic remanence of those cores which have been set thereby producing a pulse in the sense windings of said reversed cores, a resistive element switching circuit means corresponding to each of said resistive elements of said print head each of which is responsive to the said pulse appearing in the said sense winding of said corresponding core upon the reversal of the state of magnetic remanence of that core for selecting the respective resistive elements to be energized, means for energizing said selected resistive elements with a short duration electrical pulse, and a transport switching circuit means responsive to said read-out switching circuit means for energizing said transport mechanism for advancing said record material.

2. The thermal printer described in claim 1 wherein the said resistive elements are arranged in the form of a matrix of five columns and seven rows.

3. A thermal printer comprising a print head capable of marking a thermally sensitive record material having a plurality of resistive elements and a respective electrical circuit means for each of said resistive elements whereby the character to be printed may be outlined as a series of dots by energizing selected ones of said electrical circuit means with a short duration electrical pulse which produces in the corresponding resistive elements a temperature rise of sufficient magnitude to produce marks in the form of dots on thermally sensitive record material in cooperative relationship therewith, a source of direct current potential, a transport mechanism for advancing said record material by and in cooperative relationship with said print head, a first plurality of character keys each corresponding to a single character of a first character group, a second plurality of dual character keys each corresponding to a single character of said first character group and a single character of a second character group, first and second character group selecting keys for selecting the character group to be printed, a magnetic core of the type having substantially square hysteresis loop characteristics corresponding to each of said plurality of resistive elements on said print head, a set winding for each character to be printed and each threading all of said cores which correspond to the said resistive elements which must be energized to form that character, a sense winding threading each of said cores, a read-out winding threading all of said cores in a sense opposite that of said set windings, an electrical switch means associated with and operated by each of said character keys for establishing a first electrical circuit from said source of direct current potential through the said set winding for the character to which the associated key corresponds, for setting the threaded cores in a selected state of magnetic remanence, a character group select switching means responsive to the operation of said first and second character group selecting keys for effecting the completion of said first electrical circuit through the said set windings of only those characters of the group so selected, a read-out switching circuit for completing a second electrical circuit through said read-out winding for reversing the state of magnetic remanence of those cores which have been set thereby producing a pulse in the sense windings of said reversed cores, a resistive element switching circuit means corresponding to each of said resistive elements each of which is responsive to the said pulse appearing in the said sense winding of said corresponding core upon the reversal of the state of magnetic remanence of that core for selecting the respective resistive elements to be energized, means for energizing said selected resistive elements with a short duration electrical pulse, and a transport switching circuit means responsive to said read-out switching circuit means for energizing said transport mechanism for advancing said record material.

4. The thermal printer described in claim 3 wherein the said resistive elements are arranged in the form of a matrix of five columns and seven rows.

5. A thermal printer comprising a print head capable of marking a thermally sensitive record material having a plurality of resistive elements arranged in the form of a matrix and a respective electrical circuit means for each of said resistive elements whereby the character to be printed may be outlined as a series of dots by energizing selected ones of said electrical circuit means with a short duration electrical pulse which produces in the corresponding resistive elements a temperature rise of sufficient magnitude to produce marks in the form of dots on thermally sensitive record material in cooperative relationship therewith, a source of direct current potential, a transport mechanism for advancing said record material by and in cooperative relationship with said print head, a plurality of keys each corresponding to a character to be printed, a magnetic core of the type having substantially square hysteresis loop characteristics corresponding to each of said plurality of resistive elements on said print head, a set winding for each character to be printed and each threading all of said cores which correspond to the said resistive elements which must be energized to form that character, a sense winding threading each of said cores, a read-out winding threading all of said cores in a sense opposite that of said set windings, an electrical switch means associated with and operated by each of said keys for setting up a first electrical circuit from said source of direct current potential through the said set winding for the character to which the associated key corresponds, a delay circuit means for later completing the said first electrical circuit for setting the threaded cores in a selected state of magnetic remanence, a read-out switching circuit means responsive to the operation of said delay circuit means for completing a second electrical circuit through said read-out winding for reversing the state of magnetic remanence of those cores which have been set thereby producing a pulse in the sense windings of said reversed cores, a resistive element switching circuit means corresponding to each of said resistive elements of said print head each of which is responsive to the said pulse appearing in the said sense winding of said corresponding core upon the reversal of the state of magnetic remanence of that core for selecting the respective resistive elements to be energized, means for energizing said selected resistive elements with a short duration electrical pulse, and a transport switching circuit means responsive to said read-out switching circuit means for energizing said transport mechanism for advancing said record material.

6. A thermal printer comprising a print head capable of marking a thermally sensitive record material having a plurality of resistive elements arranged in the form of a matrix and a respective electrical circuit means for each of said resistive elements whereby the character to be printed may be outlined as a series of dots by energizing selected ones of said electrical circuit means with a short duration electrical pulse which produces in the corresponding resistive elements a temperature rise of sufficient magnitude to produce marks in the form of dots on thermally sensitive record material in cooperative relationship therewith, a source of direct current potential, a transport mechanism for advancing said record material by and in cooperative relationship with said print head, a first plurality of character keys each corresponding to a single character of a first character group, a second plurality of dual character keys each corresponding to a single character of said first character group and a single character of a second character group, first and second character group selecting keys for selecting the character group to be printed, a magnetic core of the type having substantially square hysteresis loop characteristics corresponding to each of said plurality of resistive elements on said print head, a set winding for each character to be printed and each threading all of said cores which correspond to the said resistive elements which must be energized to form that character, a sense winding threading each of said cores, a read-out winding threading all of said cores in a sense opposite that of said set windings, an electrical switch means associated with and operated by each of said character keys for setting up a first electrical circuit from said source of direct current potential through the said set winding for the character to which the associated key corresponds, a delay circuit means for later completing the said first electrical circuit for setting the threaded cores in a selected state of magnetic remanence, a character group select switching means responsive to the operation of said first and second character group selecting keys included in said delay circuit means for effecting the completion of said first electrical circuit through the said set windings of only those characters of the group so selected, a read-out switching circuit means responsive to the operation of said delay circuit means for completing a second electrical circuit through said read-out winding for reversing the state of magnetic remanence of those cores which have been set thereby producing a pulse in the sense windings of said reversed cores, a resistive element switching circuit means corresponding to each of said resistive elements each of which is responsive to the said pulse appearing in the said sense winding of said corresponding core upon the reversal of the state of magnetic remanence of that core for selecting the respective resistive elements to be energized, means for energizing said selected resistive elements with a short duration electrical pulse, and a transport switching circuit means responsive to said read-out switching circuit means for energizing said transport mechanism for advancing said record material.

7. A thermal printer comprising a plurality of print heads capable of marking a thermally sensitive record material each having a plurality of resistive elements arranged in the form of a matrix and a respective electrical circuit means for each of said resistive elements whereby the character to be printed may be outlined as a series of dots by energizing selected ones of said electrical circuit means with a short duration electrical pulse which produces in the corresponding resistive elements a temperature rise of sufficient magnitude to produce marks in the form of dots on thermally sensitive record material in cooperative relationship therewith, a source of direct current potential, a transport mechanism for advancing said record material by and in cooperative relationship with said print heads, a plurality of keys each corresponding to a character to be printed, a magnetic core of the type having substantially square hysteresis loop characteristics corresponding to each said plurality of resistive elements on any one of said print heads, a set winding for each character to be printed and each threading all of said cores which correspond to said resistive elements which must be energized to form that character, a sense winding threading each of said cores, a read-out winding threading all of said cores in a sense opposite that of said set windings, an electrical switch means associated with and operated by each of said keys for establishing a first electrical circuit from said source of direct current potential through the said set winding for the character to which the associated key corresponds for setting the threaded cores in a selected state of magnetic remanence, a read-out switching circuit means for completing a second electrical circuit through said read-out winding for reversing the state of magnetic remanence of those cores which have been set thereby producing a pulse in the sense windings of said reversed cores, a print head select switching circuit means responsive to the operation of said read-out switching circuit means for selecting the print head unit to be energized, a resistive element switching circuit means corresponding to each of said resistive elements of any one of said print heads each of which is responsive to the said pulse appearing in the said sense winding of said corresponding core upon the reversal of the state of magnetic remanence of that core for selecting the respective resistive elements to be energized, means for energizing said selected resistive elements with a short duration electrical pulse, and a transport switching circuit means responsive to said read-out switching circuit means for energizing said transport mechanism for advancing said record material.

8. A thermal printer comprising a plurality of print heads capable of marking a thermally sensitive record material each having a plurality of resistive elements arranged in the form of a matrix and a respective electrical circuit means for each of said resistive elements whereby the character to be printed may be outlined as a series of dots by energizing selected ones of said electrical circuit means with a short duration electrical pulse which produces in the corresponding resistive elements a temperature rise of suffcient magnitude to produce marks in the form of dots on thermally sensitive record material in cooperative relationship therewith, a source of direct current potential, a transport mechanism for advancing said record material by and in cooperative relationship with said print heads, a first plurality of character keys each corresponding to a single character of a first character group, a second plurality of dual character keys each corresponding to a single character of said first character group and a single characer of a second character group, first and second character group selecting keys for selecting the character group to be printed, a magnetic core of the type having substantially square hysteresis loop characteristics corresponding to each of said plurality of resistive elements on any one of said print heads, a set winding for each character to be printed and each threading all of said cores which correspond to the said resistive elements which must be energized to form that character, a sense winding threading each of said cores, a read-out winding threading all of said cores in a sense opposite that of said set windings, an electrical switch means associated with and operated by each of said character keys for establishing a first electrical circuit from said source of direct current potential through the said set winding for the character to which the associated key corresponds for setting the threaded cores in a selected state of magnetic remanence, a character group select switching means responsive to the operation of said first and second character group selecting keys for effecting the completion of said first electrical circuit through the said set windings of only those characters of the group so selected, a read-out switching circuit means completing a second electrical circuit through said read-out winding for reversing the state of magnetic remanence of those cores which have been set thereby producing a pulse in the sense windings of said reversed cores, a print head select switching circuit means responsive to the operation of said read-out switching means for selecting the print head unit to be energized, a resistive element switching circuit means corresponding to each of said resistive elements of any one of said print heads each of which is responsive to the said pulse appearing in the said sense winding of said corresponding core upon the reversal of the state of magnetic remanence of that core for selecting the respective resistive elements to be energized, means for energizing said selected resistive elements with a short duration electrical pulse, and a transport switching circuit means responsive to said read-out switching circuit means for energizing said transport mechanism for advancing said record material.

9. A thermal printer comprising a plurality of print heads capable of marking a thermally sensitive record material each having a plurality of resistive elements arranged in the form of a matrix and a respective electrical circuit means for each of said resistive elements whereby the character to be printed may be outlined as a series of dots by energizing selected ones of said electrical circuit means with a short duration electrical pulse which produces in the corresponding resistive elements a temperature rise of sufficient magnitude to produce marks in the form of dots on thermally sensitive record material in cooperative relationship therewith, a source of direct current potential, a transport mechanism for advancing said record material by and in cooperative relationship with said print heads, a plurality of keys each corresponding to a character to be printed, a magnetic core of the type having substantially square hysteresis loop characteristics corresponding to each of said plurality of resistive elements on any one of said print heads, a set winding for each character to be printed and each threading all of said cores which correspond to the said resistive elements which must be energized to form that character, a sense winding threading each of said cores, a read-out winding threading all of said cores in a sense opposite that of said set windings, an electrical switch means associated with and operated by each of said keys for setting up a first electrical circuit from said source of direct current potential through the said set winding for the character to which the associated key corresponds, a delay circuit means for later completing the said first electrical circuit for setting the threaded cores in a selected state of magnetic remanence, a read-out switching circuit means responsive to the operation of said delay circuit means for completing a second electrical circuit through said read-out winding for reversing the state of magnetic remanence of those cores which have been set thereby producing a pulse in the sense windings of said reversed cores, a print head select switching circuit means responsive to the operation of said read-out switching circuit means for selecting the print head to be energized, a resistive element switching circuit means corresponding to each of said resistive elements of any one of said print heads each of which is responsive to the said pulse appearing in the said sense winding of said corresponding core upon the reversal of the state of magnetic remanence of that core for selecting the respective resistive elements to be energized, means for energizing said selected resistive elements with a short duration electrical pulse, and a transport switching circuit means responsive to said read-out switching circuit means for energizing said transport mechanism for advancing said record material.

10. A thermal printer comprising a plurality of print heads capable of marking a thermally sensitive record material each having a plurality of resistive elements arranged in the form of a matrix and a respective electrical circuit means for each of said resistive elements whereby the character to be printed may be outlined as a series of dots by energizing selected ones of said electrical circuit means with a short duration electrical pulse which produces in the corresponding resistive elements a temperature rise of sufficient magnitude to produce marks in the form of dots on thermally sensitive record material in cooperative relationship therewith, a source of direct current potential, a transport mechanism for advancing said record material by and in cooperative relationship with said print heads, a first plurality of character keys each corresponding to a single character of a first character group, a second plurality of dual character keys each corresponding to a single character of said first character group and a single character of a second character group, first and second character group selecting keys for selecting the character group to be printed, a magnetic core of the type having substantially square hysteresis loop characteristics corresponding to each of said plurality of resistive elements on any one of said print heads, a set winding for each character to be printed and each threading all of said cores which correspond to the said resistive elements which must be energized to form that character, a sense winding threading each of said cores, a read-out winding threading all of said cores in a sense opposite to that of said set windings, an electrical switch means associated with and operated by each of said character keys for setting up a first electrical circuit from said source of direct current potential through the said set winding for the character to which the associated key corresponds, a delay circuit means for later completing the said first electrical circuit for setting the threaded cores in a selected state of magnetic remanence, a character group select switching means responsive to the operation of said first and second character group selecting keys included in said delay circuit means for effecting the completion of said first electrical circuit through the said set windings of only those characters of the group so selected, a read-out switching circuit means responsive to the operation of said delay circuit means for completing a second electrical circuit through said read-out winding for reversing the state of magnetic remanence of those cores which have been set thereby producing a pulse in the sense windings of said reversed cores, a print head select switching circuit means responsive to the operation of said read-out switching means for selecting the print head to be energized, a resistive element switching circuit means corresponding to each of said resistive elements of any one of said print heads each of which is responsive to the said pulse appearing in the said sense winding of said corresponding core upon the reversal of the state of magnetic remanence of that core for selecting the respective resistive elements to be energized, means for energizing said selected resistive elements wtih a short duration electrical pulse, and a transport switching circuit means responsive to said read-out switching circuit means for energizing said transport mechanism for advancing said record material.

References Cited in the file of this patent

UNITED STATES PATENTS

| | | |
|---|---|---|
| 1,028,037 | Lilleberg | May 28, 1912 |
| 1,114,612 | Hibbard | Oct. 20, 1914 |
| 1,306,631 | Rogers | June 10, 1919 |
| 2,334,534 | Ballweg | Nov. 16, 1943 |
| 2,353,083 | Roth | July 4, 1944 |
| 2,486,985 | Ruderfer | Nov. 1, 1949 |
| 2,917,996 | Epstein et al. | Dec. 22, 1959 |
| 2,950,159 | McCulley et al. | Aug. 23, 1960 |